United States Patent [19]
Chen et al.

[11] Patent Number: 5,686,887
[45] Date of Patent: Nov. 11, 1997

[54] ELECTRONIC LOCATING DEVICE

[75] Inventors: Sidney Yiu Kwok Chen, Houston; Patricia Elaine Bibb; Ben Lee Bibb, both of Cedar Park, all of Tex.; Phillipe Sebrechts, San Diego, Calif.

[73] Assignee: Schoeferisch Aeusserung Anstalt, Vaduz, Liechtenstein

[21] Appl. No.: 351,014

[22] Filed: Dec. 7, 1994

[51] Int. Cl.$^6$ .............................. G08B 1/08; G08C 19/00
[52] U.S. Cl. ............... 340/539; 340/825.69; 340/625.72
[58] Field of Search .......................... 340/539, 531, 340/825.69, 825.72, 825.57; 341/176

[56] References Cited

U.S. PATENT DOCUMENTS

| | | | |
|---|---|---|---|
| 3,550,105 | 12/1970 | De Cola et al. | |
| 3,795,896 | 3/1974 | Isaacs | 340/539 |
| 4,101,873 | 7/1978 | Anderson et al. | 340/539 |
| 4,191,948 | 3/1980 | Stockdale | 340/539 |
| 4,232,308 | 11/1980 | Lee et al. | 340/539 |
| 4,476,469 | 10/1984 | Lander | 340/539 |
| 4,507,653 | 3/1985 | Bayer | 340/539 |
| 4,535,333 | 8/1985 | Twardowski | 340/825.69 |
| 4,591,835 | 5/1986 | Sharp | 340/539 |
| 4,623,887 | 11/1986 | Wells, II | 340/825.69 |
| 4,631,708 | 12/1986 | Wood et al. | 340/825.54 |
| 4,660,022 | 4/1987 | Osaka | |
| 4,804,943 | 2/1989 | Soleimani | 340/539 |
| 4,935,907 | 6/1990 | Friedman | 367/118 |
| 5,028,919 | 7/1991 | Hidaka | 340/825.69 |
| 5,204,657 | 4/1993 | Prosser et al. | 340/568 |
| 5,471,668 | 11/1995 | Soenen et al. | 340/539 |

OTHER PUBLICATIONS

Microchip Technology, Inc., "EPROM-Based 8-Bit CMOS Microcontroller Series", *PIC16C5X*, Jan. 1991, DS30015H-pp. 1-52.

*Primary Examiner*—Donnie L. Crosland
*Attorney, Agent, or Firm*—Welsh & Katz, Ltd.

[57] ABSTRACT

An apparatus and method suitable for use as an electronic remote locating device. The method including synchronizing an unprogrammed receiver with a transmitter so that the unprogrammed receiver responds only to the transmitter. The transmitter continuously increments a storage element when electrical power is initially applied to the transmitter and halts incrementing of the storage element when a first event is detected. Next, the transmitter saves the value of the storage element in memory as the unique identification code. The transmitter then transmits the identification code for a first predetermined length of time at a preselected frequency. The receiver monitors the preselected frequency searching for a received identification code for a predetermined period of time after electrical power is applied to the receiver. The receiver then verifies the validity of the received identification code and determines whether a prior identification code exists in the memory of the receiver. The receiver saves the received identification code in memory if the prior identification code was not found in the memory and halts the monitoring. The receiver then periodically monitors the preselected frequency range and compares the received identification code to the prior identification code. The receiver issues an indication to the user if the received identification code equals the prior identification code.

44 Claims, 9 Drawing Sheets

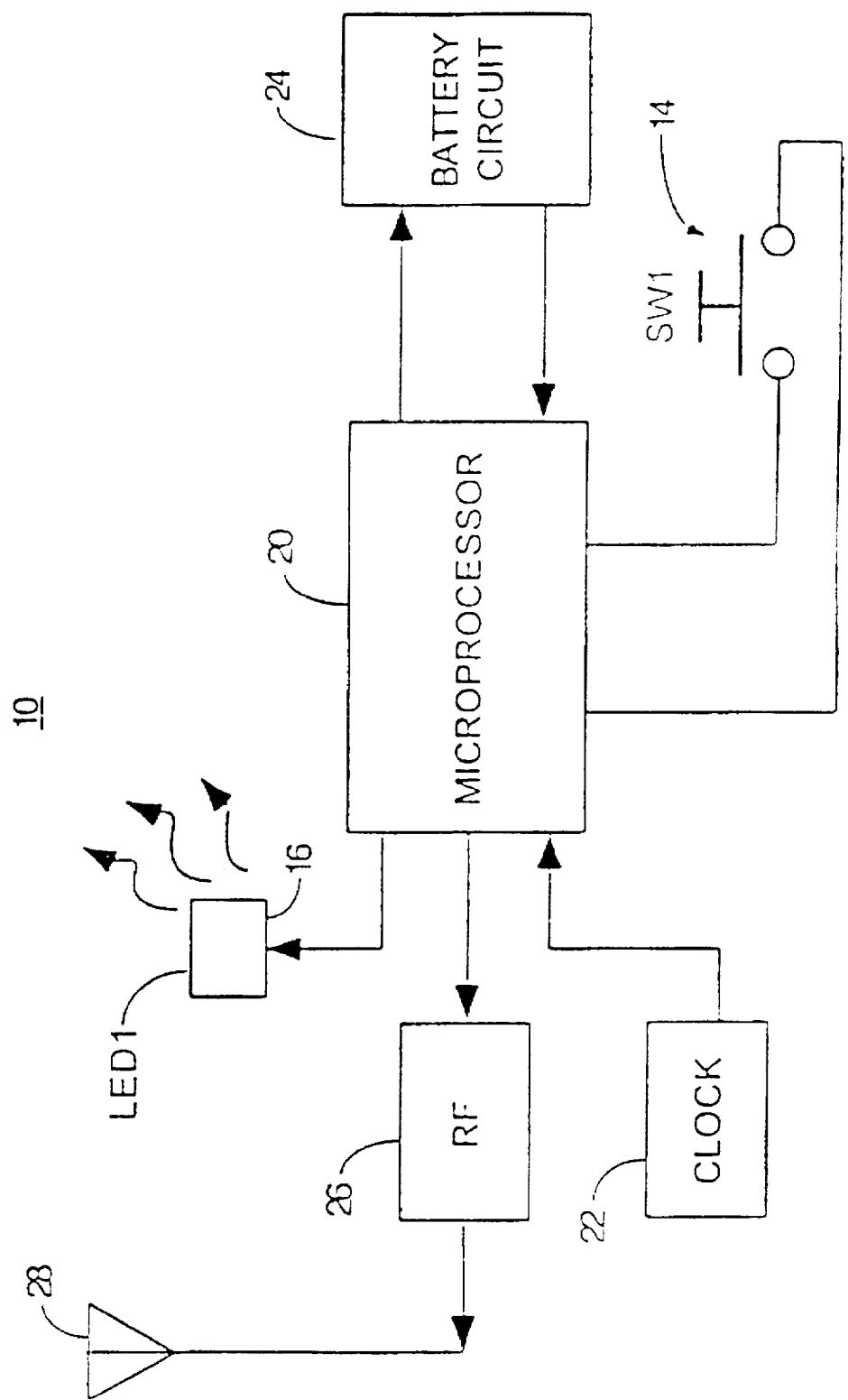

ELECTRONIC LOCATING DEVICE

The portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates generally to electronic remote locating systems and more particularly to selectively actuated radio frequency (RF) receivers responsive to signals emitted from a corresponding transmitter to provide an audible response indicating the position of the receiver.

A need has long existed for a reliable and inexpensive locating device to assist persons in locating misplaced articles. For example, eyeglasses, purses, tools, remote control devices for home electronic equipment, keys, and other small articles which are commonly misplaced may be particularly difficult and frustrating to find. Additionally, portable electronic devices such as portable computers, portable telephones, pagers, and photographic equipment may also become lost or misplaced.

Locating devices may also be used to locate an object, such as an animal or a person to which the receiver is attached. Today, many households own a wide variety of consumer electronic devices, such as televisions, video cassette recorders, stereo equipment, and the like. Often, remote control devices are provided along with the consumer equipment for the convenience of the customer. Frequently, one household may own two or more individual remote control devices. When these remote control devices are lost or misplaced, the customer may become frustrated. Quickly locating lost or misplaced items saves considerable time and effort.

A number of methods and devices for locating missing or misplaced objects are known. For example, automobiles may be located by activating a locating device attached to a key chain which activates the automobile's lights or sounds the horn so that the owner can locate the car in a crowded parking lot. However, such devices are typically not removable from the car, thus, are not versatile and cannot be adapted to locate other items of the consumer's choice. These devices are typically configured so that one receiver responds to one and only one transmitter. These devices are relatively expensive and the cost of implementing such a device to locate many small household items is prohibitive.

Many prior art communication mediums are available to allow a transmitter to communicate with a receiver, such as infra-red, optical, ultrasound, and radio frequency mediums. Each medium has advantages and disadvantages relating to cost, power efficiency, range, signal directionality, line of sight requirements, and FCC regulations. Infra-red and other light based devices generally utilize line-of-sight communications between the receiver and transmitter. Thus, functionality is severely limited. Additionally, the signal is typically highly directional and requires that the transmitter output be directed toward to receiver. Ultrasound has also been used as a method for communication between the transmitter and the receiver. Although these devices provide for greater range than infra-red devices, they are power inefficient and are relatively expensive.

For a receiver to distinguish a particular transmitter's signal or identification code, the transmitter must output a unique identification code that the receiver recognizes. The process of generating the transmitter identification code is called "transmitter serialization" while the process of programming the transmitter identification code into the receiver is called "receiver synchronization".

Historically, manufacturers of low cost transmitter and receiver units have reduced product costs by using fixed numeric codes or fixed switch positions (e.g. DIP switches) so that the receiver recognizes the transmitter identification code and responds accordingly. The use of improperly set DIP switches is a major drawback of known devices, since users have been know to purchase and use devices while leaving the DIP switches in their factory default settings. This presents problems with respect to security since receiver response to an unauthorized transmitter code is highly undesirable.

Known systems are relatively inflexible and inconvenient, often requiring the user to perform a complicated and often frustrating process of changing switch settings, or programming the device by entering various codes. Often, consumers cannot reprogram the devices and must seek help from service personnel or from the manufacturer. Additionally, code changing or reprogramming may be required if the programming information is lost when the batteries are changed, or if nearby transmitters interfere with the user's unit, as may occur in a crowded neighborhood having several remote locator devices.

Accordingly, it is an object of the present invention to promote a novel locating device which is inexpensive, flexible, and easy to operate that can be used to locate misplaced or lost household items.

It is another object of the present invention to provide a novel locating device that is easy for the user to program and does not require factory or user defined switch settings.

It is another object of the present invention to extend battery life by conserving battery power, and to inform the user when battery power is low.

It is another object of the present invention to allow the batteries to be changed without losing programming information.

It is an additional object of the present invention to provide a receiver that is sensitive to motion to allow the user to reset an activated receiver by physically shaking it.

The locating device according to the present invention is especially useful for determining the location of a misplaced appliance or entertainment remote control unit. When the receiver is attached to or incorporated into an article, such as a remote control unit, and that unit has been misplaced, the receiver will emit an audio indication to alert the user in response to a transmitter signal initiated by the user. In one embodiment, the receiver may be physically attached to an existing remote control device. In another embodiment, the receiver may be incorporated into the remote control or other device during product design. Alternatively, the receiver may be added to an existing product using units that share power and/or the housing of the host product, such as by direct insertion into the battery compartment of the host product where, in addition to supplying the locating function, it also supplies battery power.

The locating device is also useful as an integral part of a game in which the device may be hidden by a player and sought by a fellow player. When used as a game, the receiver may be attached to an object or person to be found by one or more players of the "hide and seek" game.

The locating device may include multiple transmitters and multiple receivers. A single transmitter can activate several receivers, multiple transmitters may activate a single receiver, or any combination of transmitters and receivers may be employed. The transmitter may communicate with the receiver using radio-frequency (RF) signals or any other suitable communications medium. Radio frequency communication is power efficient and does not require a line of sight between the transmitter and the receiver. Additionally, the RF signal is omnidirectional and does not require the transmitter to be pointed in the direction of the receiver. The transmitter and receiver comply with all Federal Communication Commission (FCC) regulations governing RF emissions.

In one embodiment, the locating device utilizes a novel method and apparatus for synchronizing the receiver with the transmitter so that an unprogrammed receiver is responsive only to particular transmitters. The method includes continuously incrementing a storage element in the transmitter when electrical power is initially applied to the transmitter and halting incrementing of the storage element when a button on the transmitter is depressed by the user. The transmitter saves the value of the storage element in a memory of the transmitter as a unique identification code. Next, the transmitter transmits the identification code for a first predetermined length of time while the receiving device scans the same preselected frequency searching for an identification code, for a second predetermined period of time, when electrical power is initially applied to the receiver. The receiver then verifies the validity of the identification code and saves the validated identification code in a memory of the receiver. The receiver then stops scanning the preselected frequency for a predetermined period of time.

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings.

FIG. 2 is a block diagram of one embodiment of a transmitter according to the present invention.

DETAILED DESCRIPTION OF THE INVENTION

Figure 1A:
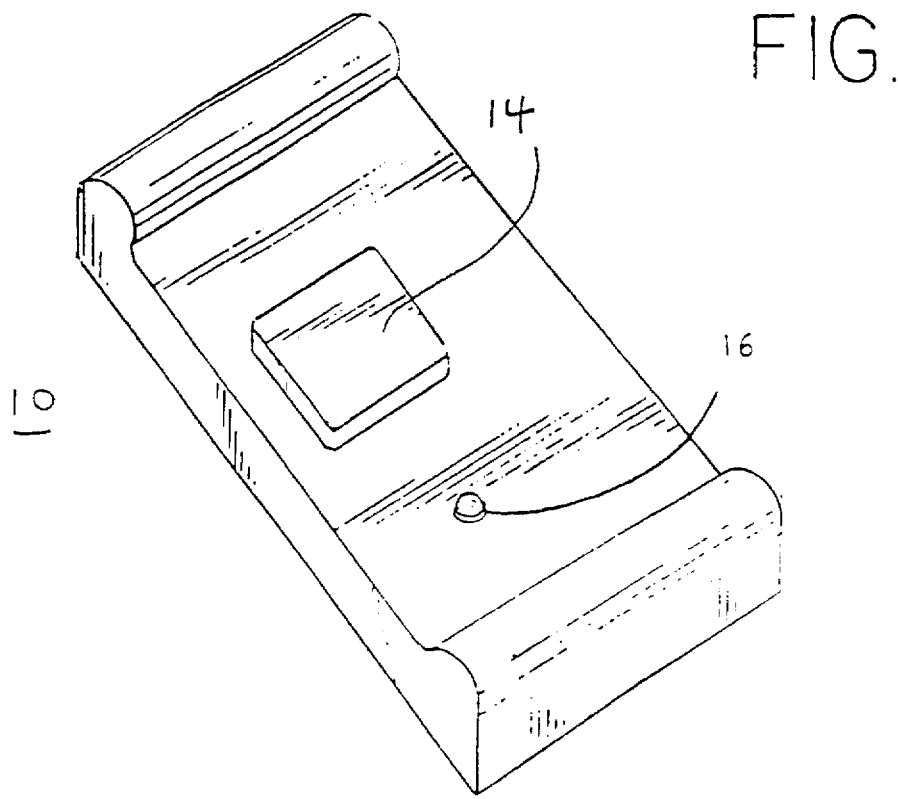
FIGS. 1A and 1B are pictorial representations, respectively, of one embodiment of a transmitter enclosure and a receiver enclosure according to the present invention.
Figure 1B:
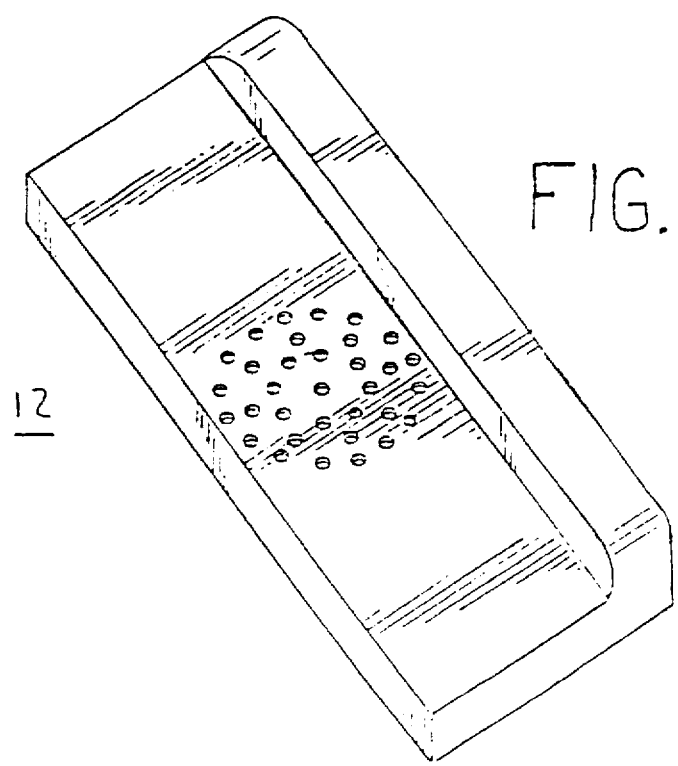

Referring now to FIG. 1A, one embodiment of an enclosure for a transmitter 10 unit is illustrated which may be attached to a known fixed location, presumably at a central location or a convenient and accessible area. The user may use double sided tape, VELCRO®, or any suitable method to secure the transmitter, if desired. One embodiment of an enclosure for receiver 12 is illustrated in FIG. 1B which may also be attached to a household article to be located, by double sided tape, VELCRO®, or any suitable method. In another desirable embodiment the circuitry of the transmitter (s) 10 and the receiver(s) 12 are incorporated into an existing product enclosure, and in yet another embodiment, the receiver may be adapted to be inserted into the existing product housing (e.g., in the form of an enclosure including the receiver and the unit batteries where the housing is structured to replace the existing product's standard batteries).

Multiple receivers 12 may be used with a single transmitter 10. Each transmitter 10 generates and saves a unique identification code that is recognized by the receiver(s) 12 so that the receiver is able to distinguish that particular transmitter's signal. The transmitter 10 includes a pushbutton 14, and one indicator, a light-emitting diode 16, as shown.

Referring now to FIG. 2, a block diagram of the transmitter 10 is shown. The transmitter 10 includes a microprocessor section 20, which receives clock signals from a clock circuit 22. A battery circuit 24 supplies power to the microprocessor section 20 and also supplies power to an RF section 26. An antenna 28 broadcasts the signal from the output of the RF block 26 which is activated under control of the microprocessor section 20. A switch 14 attached to the microprocessor section 20 permits activation of predefined user functions, while an LED 16 provides user feedback, as will be described below.

Figure 3:
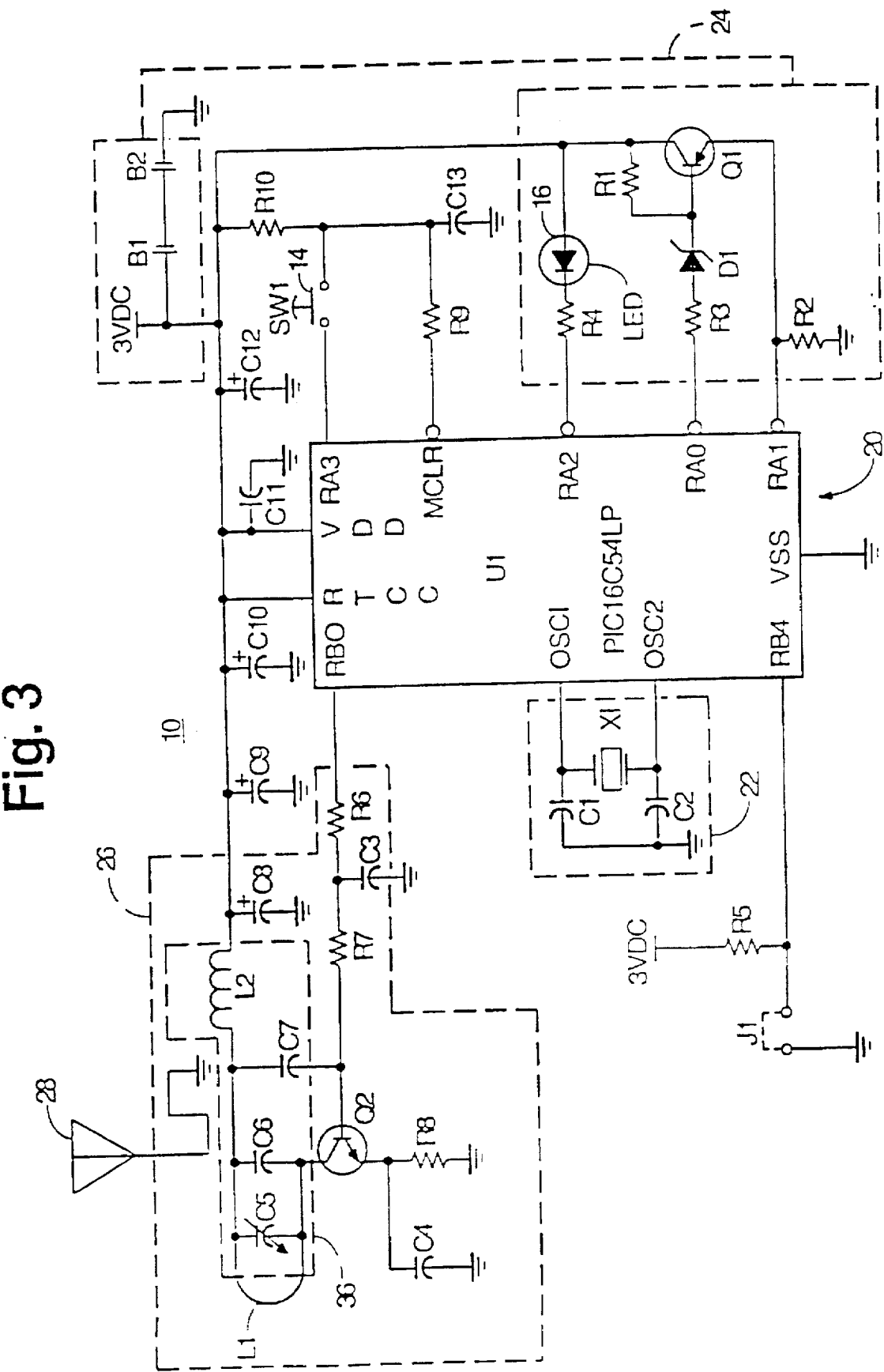
FIG. 3 is a schematic diagram of one embodiment of the transmitter of FIG. 2 according to the present invention.

Referring now to FIG. 3, an illustrated schematic diagram of a specific embodiment of the transmitter 10 is shown. In FIG. 3 the circuitry corresponding to the circuit blocks of FIG. 2 are enclosed with dashed lines and labelled with the same corresponding reference numerals.

In the illustrated embodiment of FIG. 3, the transmitter 10 includes the microprocessor section 20 essentially comprising an 8-bit EPROM (electrically programmable read-only memory) based CMOS microprocessor U1 as is well known in the art. The microprocessor U1 in the illustrated embodiment of FIG. 3 is a PIC16C54LP manufactured by Microchip Technologies.

The clock circuit 22 includes a crystal X1 connected across microprocessor inputs OSC1 and OSC2, respectively. A capacitor C1 is connected between the end of the crystal X1 that is connected to OSC1, and ground, while a capacitor C2 is connected from the other end of the crystal to ground. The crystal X1 and the capacitors C1 and C2 determine the oscillator clock frequency for the microprocessor U1 as is well known in the art.

The battery test circuit 24 (two blocks are shown connected together), is shown connected to microprocessor I/O pins RA0, RA1, and RA2, and includes two batteries B1 and B2, resistors R1, R2, R3, R4, a zener diode D1, a light-emitting diode LED1, and a transistor Q1, as shown. The batteries B1 and B2 are connected in series to supply +3 volts to the circuitry of the transmitter circuit 10. The connection to the +3V supply point is labeled +3VDC. The resistor R4 in series with the LED 16 is connected between the microprocessor Input/Output (I/O) pin RA2 and the collector of the transistor Q1, which is further connected to +3VDC. The LED 16, under microprocessor control is illuminated when microprocessor I/O pin RA2 is switched to a logical low. The resistor R1 couples the collector of transistor Q1 to its base providing a suitable bias voltage for the transistor and is further coupled to the microprocessor I/O pin RA0 through the series combination of the zener diode D1 and the resistor R3, as shown. Additionally, the emitter of the transistor Q1 is coupled to the microprocessor I/O pin RA1, which is further connected to ground through the resistor R2.

In operation, in the embodiment illustrated in FIG. 3, the transmitter 10 will operate whenever the battery voltage is above 2.4 volts, while the microprocessor U1 will function when at least 2.2 volts is supplied. A battery testing operation is initiated when the microprocessor U1 switches the microprocessor I/O pin RA0 low causing transistor Q1 to conduct. This places the battery voltage +3VDC across resistor R2, which acts a test load. If the battery voltage drop across resistor R2 is sufficient to cause a high logic level to be read on the microprocessor I/O pin RA1, then the battery is considered functional. Resistor R3 sets the turn-on point for the transistor Q1, and hence, the hysteresis point for the battery circuit 24. The LED 16 may be alternately turned-on and off for a predetermined period of time in response to a failed battery test by setting the microprocessor I/O pin RA2 low and high, respectively. The battery test is performed on a demand basis, that is, it is performed each time the switch 14 is depressed as will be described below. If the battery test is successful, no additional user indication is provided and the transmitter enters a sleep state. If the battery test fails, but there is still enough battery life to power the transmitter 10, the LED 16 flashes eight times as a user indication and the transmitter enters a sleep state. Two AAA-type batteries may supply power to the transmitter 10 for about one year under normal operating conditions.

Power to the microprocessor U1 is supplied through a pin Vdd while a pin Vss is connected to ground to complete the circuit. To permit testing, the microprocessor I/O pin RB4 is pulled-up to +3VDC through resistor R5 and is also connected to jumper J1. When the jumper J1 is installed, grounding microprocessor I/O pin RB4, the microprocessor U1 is forced into an FCC test mode. In this mode, the microprocessor U1 causes a continuous pulse width modulated signal to be produced so that test measurements may be taken. The illustrated embodiment of the transmitter 10 meets the requirements set forth by FCC rules for unlicensed operation under 47 C.F.R. 15 subpart C.

The RF section 26 of the transmitter 10 includes resistors R6–R8, capacitors C3–C8, inductors L1–L2, antenna 28, and RF transistor Q2, as shown. A microprocessor I/O pin RB0 is coupled to the base of RF transistor Q2 through series resistors R6 and R7 to provide a signal to turn-on and turn-off oscillation of transistor Q2, as will be described below.

The RF transistor Q2, arranged in a grounded base configuration, oscillates at approximately 380.55 Mhz when microprocessor I/O pin RB0 is activated (high). The microprocessor I/O pin RB0, under software control, provides a variation of pulse width modulation by varying the duty cycle of the output signal to essentially provide an amplitude modulated RF output whose amplitude is either on or off. When the microprocessor I/O pin RB0 is high, transmitter Q2 oscillates. Conversely, when the microprocessor I/O pin RB0 is low, the transistor Q2 is off. Thus, the RF transmission is under direct control of the microprocessor U1. The emitter of the RF transistor Q2 is coupled to ground through the parallel combination of the resistor R8 and the capacitor C4. The combination of the resistor R8 and the capacitor C4 determines the output power level of the RF energy developed at the collector of the RF transistor Q2.

The collector of the RF transistor Q2 connects to a resonant tank circuit 36, shown enclosed in dashed lines within the RF block 26. The tank circuit 36 includes the parallel combination of inductor L1, and capacitors C5 and C6, connected to inductor L2, as shown. The other end of the inductor L2 is connected to +3VDC. The inductor L2 decouples the low impedance of the battery circuit 24 from the tank circuit 36 to allow coupling of feedback to sustain oscillation of transistor Q2. The capacitor C7 is connected between the base of the RF transistor Q2 and the first end of the inductor L2 between the inductor L2 and the tank circuit 36. The capacitor C7 adds phase shifted energy to the base of the RF transistor Q2 causing a sustained oscillation. The capacitor C7 also isolates RF energy within the RF block 26 by providing a shunt path. Thus, little RF energy escapes into the other sections of the transmitter 10. The quiescent point of the RF transistor Q2 and, thus, the starting ability of the oscillation is controlled by the reactance of the inductor L2 and the bias point set by the resistor R7 acting as a voltage to current converter.

The oscillation frequency of the transistor Q2 is established generally by the capacitor C6 and the inductor L1, and is fine-tuned by adjusting the value of the variable capacitor C5. The capacitor C3 connected between ground and the junction between the resistors R6 and R7 provides signal smoothing of the square wave signal supplied by the microprocessor I/O pin RB0 so that the transistor Q2 turns on "softly". The rise time of the digital pulse train supplied by the microprocessor I/O pin RB0 to the base of the transistor Q2 is shaped by the resistors R6, R7 and the capacitor C3 acting essentially as a low-pass filter to smooth the sharp square wave signal. The antenna 28 (e.g., in the illustrated embodiment, a nineteen centimeter wire which can be routed within the transmitter 10 case) is inductively coupled to the tank circuit 36 for external transmission of the RF energy.

The capacitors C8, C9, and C10, connected between the +3VDC side of the inductor L2 and ground provides RF isolation to minimize leakage of high frequency signals from the RF block 26 to other sections of the transmitter 10. The capacitors C8, C9, C10, C11, and C12 connected between +3VDC and ground also provide power storage for supplying power to the transmitter 10 for a limited period of time when the batteries B1 and B2 are removed. These capacitors allow the microprocessor U1 to temporarily retain all memory functions when the batteries B1 and B2 are not installed. Power can be maintained for approximately five minutes with the batteries B1 and B2 removed.

A microprocessor I/O pin RTCC connected to +3VDC enables an internal clock counter of the microprocessor U1. A master clear input MCLR of the microprocessor U1 is coupled through a resistor R9 to the common point between a capacitor C13 and a resistor R10. The other end of the resistor R10 connects to +3VDC while the other end of the capacitor C13 is grounded as shown. The combination of the resistors R9, R10 and the capacitor C13 supplies a properly shaped reset pulse to the microprocessor U1 at input MCLR when power is initially applied, as is well known in the art. The momentary contact switch 14 connected between a microprocessor I/O pin RA3 and the common point between the capacitor C13 and the resistor R10 is provided as a user control, as will be described below.

When the microprocessor I/O pin RA3 is programmed to be low, depression of the switch 14 effectively couples the microprocessor input MCLR to a logic low through the resistor R9, causing a master reset to occur. When a master reset occurs, if certain software conditions have been met (described hereinafter), the microprocessor U1 will activate the microprocessor I/O pin RB0 to control oscillation of the transistor Q2. When the microprocessor I/O pin RA3 is programmed to be high, depression of the switch 14 has no effect. The switch 14 can be selectively enabled and disabled by the microprocessor U1.

Table 1 provides examples of typical component values and part numbers suitable for the embodiment of the transmitter 10 shown in FIG. 3.

TABLE 1

TRANSMITTER COMPONENTS

| DESIGNATION | TYPE | VALUE |
| --- | --- | --- |
| ANT1 | Antenna | N/A |
| B1 | BATTERY | +1.5 V |
| B2 | BATTERY | +1.5 V |
| C1 | CAPACITOR | 22 pF |
| C2 | CAPACITOR | 22 pF |
| C3 | CAPACITOR | 47 pF |
| C4 | CAPACITOR | 1 nF |
| C5 | CAPACITOR | 1.7–3 pF |
| C6 | CAPACITOR | 6.0 pF |
| C7 | CAPACITOR | 6.0 pF |
| C8 | CAPACITOR | 1 nF |
| C9 | CAPACITOR | 22 uF @ 6 VDC |
| C10 | CAPACITOR | 22 uF @ 6 VDC |
| C11 | CAPACITOR | 1 nF |
| C12 | CAPACITOR | 68 uF @ 6 VDC |
| C13 | CAPACITOR | .01 uF |
| LED1 | LIGHT-EMITTING DIODE | ANY |
| D1 | ZENER DIODE | BZX84C2V7 |
| L1 | LOOPCOIL INDUCTOR | ETCHED |
| L2 | INDUCTOR | 3.9 uH |
| Q1 | PNP TRANSISTOR | FMMT2907A |
| Q2 | NPN TRANSISTOR | FMMT918CT |
| R1 | RESISTOR | 10 KΩ |
| R2 | RESISTOR | 39 KΩ |
| R3 | RESISTOR | 3.9 KΩ |
| R4 | RESISTOR | 120Ω |
| R5 | RESISTOR | 47 KΩ |
| R6 | RESISTOR | 1 KΩ |
| R7 | RESISTOR | 47 KΩ |
| R8 | RESISTOR | 68Ω |
| R9 | RESISTOR | 100Ω |
| R10 | RESISTOR | 39 KΩ |
| SW1 | SWITCH | PUSHBUTTON |
| U1 | PIC16C54LP | N/A |
| X1 | CRYSTAL | 32.768 Khz |

In operation, the transmitter 10 control is user friendly, since only the switch or pushbutton 14 and the LED 16 are available to the user. Once the batteries B1 and B2 are installed, the transmitter 10 automatically creates and transmits an identification code by pulse width modulating the RF oscillation of the transistor Q2. This is a variation of pulse width modulation since the RF energy is either present (i.e., during the pulse) or absent (i.e., between pulses). In effect, this is an amplitude modulation format. The identification code is automatically created and saved when the user depresses the pushbutton 14 after installation of the batteries B1 and B2. Alternatively, if the pushbutton 14 is not depressed within eight minutes after the batteries B1 and B2 are installed, a default value is selected as the identification code. In either case, the identification code selected corresponds to the value of a unique eight bit number. Initial installation of the batteries B1 and B2 may not trigger creation of the identification code. Rather, after battery installation, the user may depress the pushbutton 14 to begin the process and depresses it again to terminate the process.

In one embodiment, the identification code may be transmitted once the pushbutton 14 is depressed. The identification code is transmitted as follows: First, a preamble code is transmitted consisting of 30 milliseconds on (logic high) followed by 10 milliseconds off (logic low). This is repeated five times for a total preamble of about 200 milliseconds. Note that when the microprocessor U1 turns-on transistor Q2, the 380.55 Mhz RF energy is broadcast. During the time when the preamble is being transmitted, the receiver 12 is activated in the designated frequency region to search for the known preamble code. After the code has been transmitted five times, the identification code is transmitted.

Transmission of the eight bit code (not including the preamble) occurs as follows: A logical one or high is indicated by 20 milliseconds on followed by 10 milliseconds off, while a logical zero or low is indicated by 10 milliseconds on followed by 10 milliseconds off. This cycle is repeated for each of the eight bits of the identification code until the entire identification code has been is transmitted. The entire sequence of the preamble code and code transmission is continuously repeated for a period of time of about between 5.4 seconds to 6.6 seconds in the illustrated embodiment. During this time, the receiver 12 first recognizes the preamble code, and then receives, decodes, and saves the identification code. The result is synchronization of the receiver 12 to the unique transmitter identification code.

Figure 4:
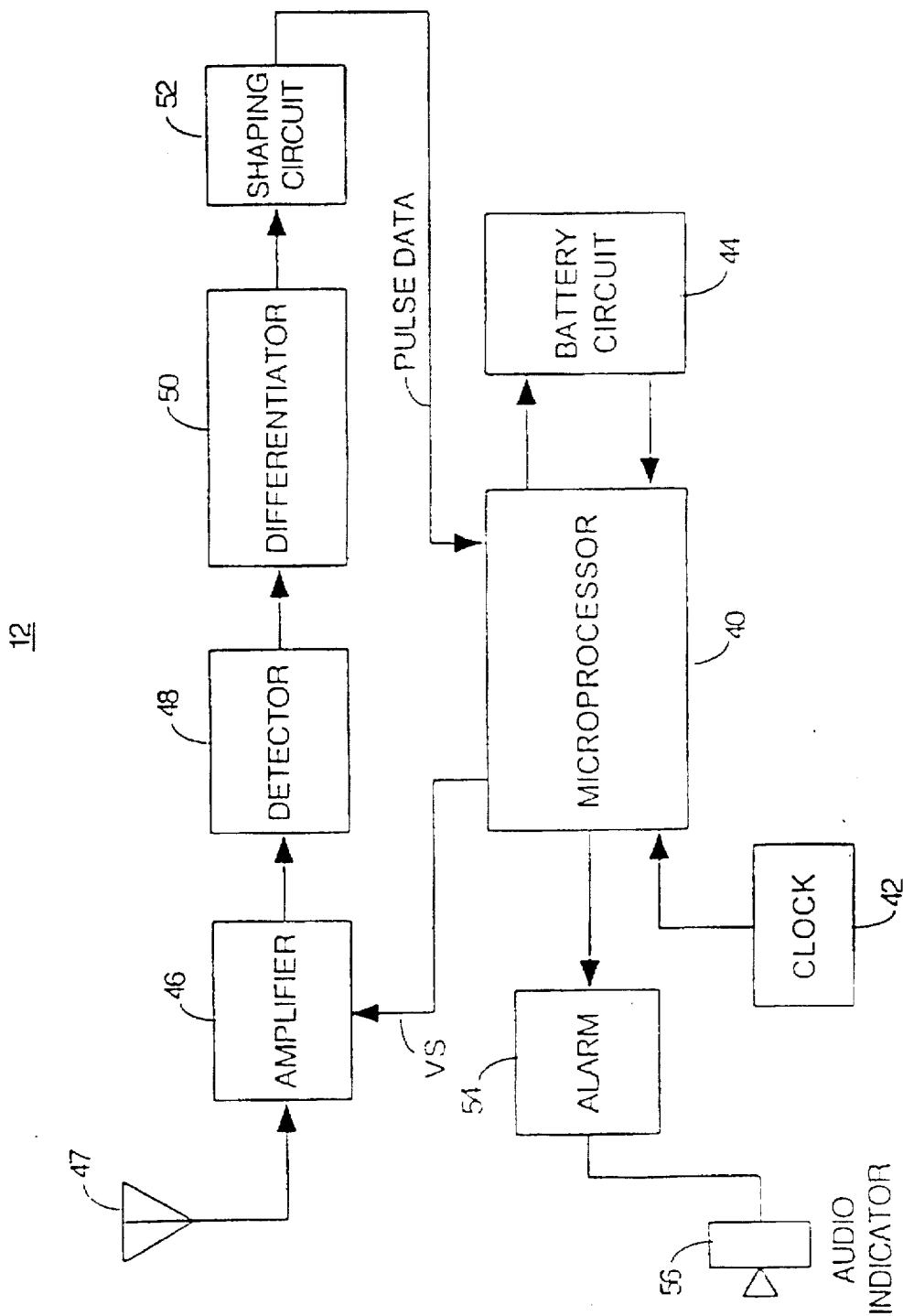
FIG. 4 is a block diagram of one embodiment of a receiver according to the present invention.

Referring now to FIG. 4, a block diagram of one embodiment of the receiver 12 is shown having eight major blocks 40–54, as shown. The receiver 12 includes a microprocessor block 40, which receives clock signals from a clock block 42. A battery circuit 44 monitors battery power and supplies power to the microprocessor section 40 and to other blocks of the receiver 12. An amplifier block 46 receives RF energy from an antenna 47 and passes an amplified signal to a super-regenerative detector block 48. The super-regenerative detector block 48, determines the presence of RF energy at a preselected frequency and passes its output to a differentiator block 50. The signal processed by the differentiator block 50 is coupled to a shaping circuit block 52, whose output is coupled to the microprocessor block 40. The microprocessor section 40 controls an alarm block 54 which drives an audio indicator block 56, under software control.

The battery circuit block 44 supplies power to the microprocessor block 40, the super-regenerative detector block 48, the differentiator block 50, the alarm block 54, and the shaper block 52. However, the microprocessor block 40 directly controls power to the amplifier block 46, as shown by a line labeled +Vs so that power can be selectively turned-off under microprocessor control to conserve power when not needed, for example, when the microprocessor block 40 enters a "sleep" mode as will be described hereinafter.

Figure 5:
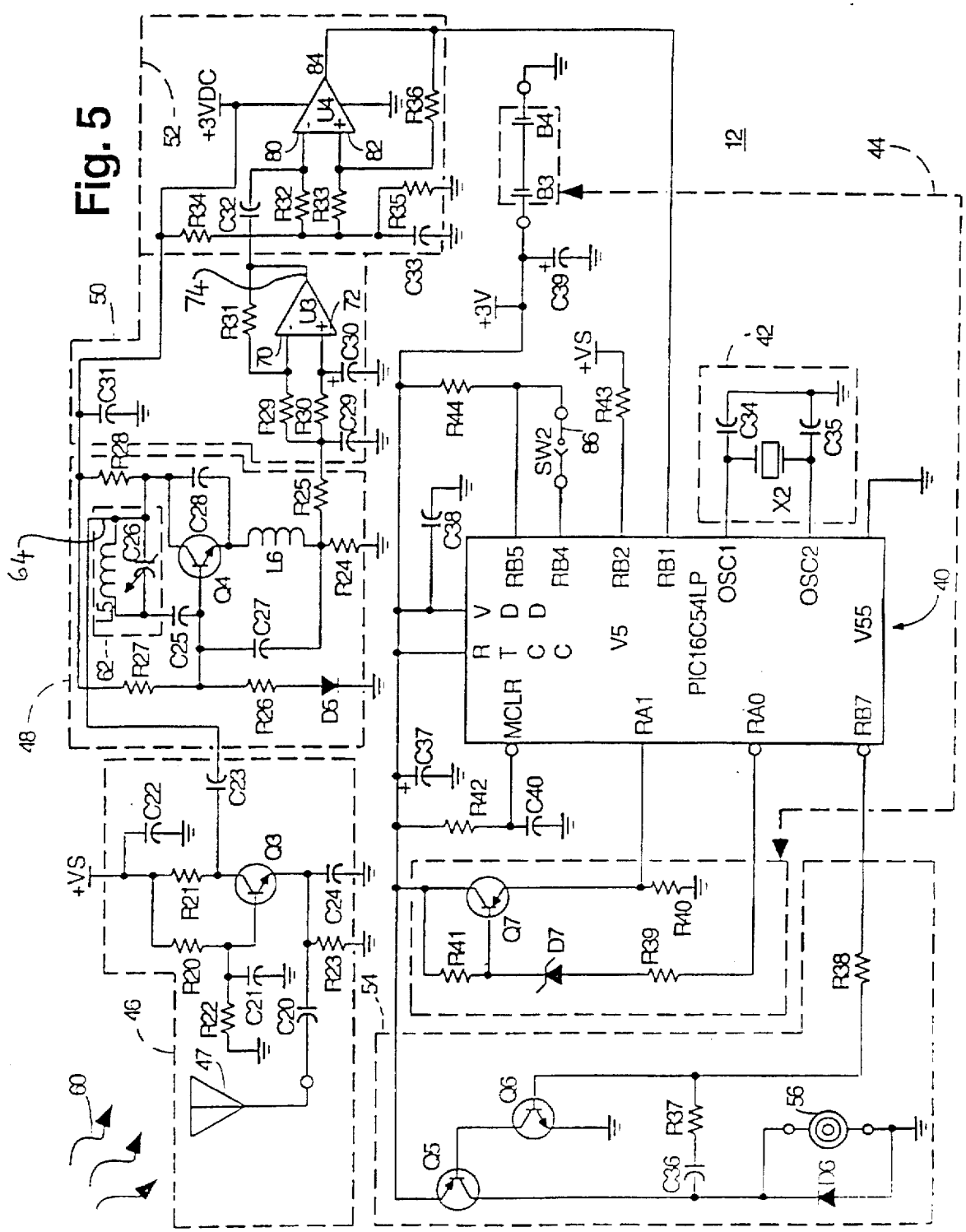
FIG. 5 is a schematic diagram of one embodiment of the receiver of FIG. 4 according to the present invention.

Referring now to FIG. 5, an illustrated schematic diagram of one embodiment of the receiver 12 of FIG. 4 is shown. In FIG. 5, the circuitry corresponding to the circuit blocks of FIG. 4 are enclosed within dashed lines and labelled with the same correspondence reference numerals.

The amplifier block 46 as shown, includes a transistor Q3, resistors R20–R23, capacitors C20–C24, coupled to the antenna 47. The receiver 12 is a super-regenerative detector and, thus, typically emits a certain amount of radio frequency noise which must be minimized to comply with FCC regulations. The primary purpose of the amplifier block 46 is to isolate, as much as possible, any RF energy created by the super-regenerative detector block 48 such that the RF energy is not radiated through the antenna 47.

Radio frequency signals 60 received by the antenna 47 are capacitively coupled to the amplifier block 46 through a capacitor C20 into the emitter of a transistor Q3. The emitter of the transistor Q3 is further coupled to ground through the parallel combination of a resistor R23 and a capacitor C24, which partially governs the gain and isolation of the amplifier block 46. Resistors R20 and R22 form a voltage divider network to bias transistor Q3 to a desired operating point. Capacitor C21 places the base of Q3 at RF ground, thus grounded base operation of this stage is obtained for maximum isolation. The collector of the transistor Q3 is coupled to voltage +Vs through a resistor R21, while a capacitor C22 connected between voltage +Vs and ground provides energy storage and filtering for noise on the supply line.

The output of the amplifier block 46 developed at the collector of the transistor Q3 is coupled to the super-regenerative detector block 48 through a coupling capacitor C23, as shown. The amplifier block 46 functions as a broad-band amplifier and does not include any tuning or filtering circuitry. Although the amplifier block 46 provides gain, its primary purpose is to isolate RF energy to prevent it from being coupled backwards from super-regenerative detector circuit 48 and to the antenna 47. A wide variety of suitable isolating amplifiers may be used for the amplifier block 46 of the illustrated embodiment.

The output of the amplifier block 46 is routed into the super-regenerative detector block 48 through the capacitor C23 and includes a transistor Q4, resistors R24–R28, capacitors C25–C28, inductors L5–L6, and a diode D5. The transistor Q4 is configured to oscillate near 380.55 Mhz by the resonant action of the inductor L5 and the capacitor C26. The capacitor C25 couples the energy from the collector into the base of the transistor Q4 to maintain oscillation and provide a degree of frequency selectivity for the received signal. The resistor R28 provides isolation of the collector RF signal from the lower impedance battery power circuit 44.

Temperature stable operating bias is established for the transistor Q4 by the voltage divider action of the resistors R26 and R27, and the diode D5 provides temperature stabilization. Oscillations build up and extinguish (quench) in this stage at an approximate rate of 100,000 cycles per second. This desirable quench mechanism is controlled by the selection of the capacitors C27, C28, and the inductor L6. The resistor R24 provides additional operating point bias stabilization.

When a signal is received within the super-regenerative detector's tuned circuit passband, the quenching action is increased substantially and higher current quench oscillations are sustained providing 100 Khz current pulses across the resistor R24 coincident with the carrier presence of the received pulse width modulated signal. Many pulses of 100 Khz energy from the quenching action are received for each burst of 380 Mhz signal providing the extreme detection gain typical of super-regenerative detectors. The resistor R14 provides isolation to the RF and quench signals present at the resistor R24 and the inductor L6 junction, and it also provides desired coupling with very little attenuation to the 100 Khz signal passed on to the capacitor C24.

The 100 Khz signal is filtered and processed by the differentiator block 50. This block 50 receives a 380.55 Mhz pulse width modulated signal and outputs 100 Khz pulses while the 380.55 Mhz signal is present. This is the same frequency at which the transmitter 10 operates. The tank circuit 62 is fine tuned by the capacitor C26 to be centered at approximately 380.55 Mhz with a tolerance of about ±50 Khz. Thus, the super-regenerative detector 48 is responsive to signals between 380.500 Mhz and 380.600 Mhz. The super-regenerative detector 48 requires very little power.

Although a super-heterodyne type receiver may alternatively be used to provide increased selectivity over the illustrated super-regenerative detector 48, it would draw substantially more current. The super-regenerative detector 48, although not as selective as a super-heterodyne detector, is extremely sensitive and requires very little power. For example, the sensitivity of the receiver 12, including the super-regenerative detector 48, is such that it can detect an input signal received on the capacitor C20 of the amplifier block 46 of between −100 dBm to −105 dBm, (which is equivalent to about 2 microvolts) in a 1 Mhz bandwidth.

As described above, the value of the inductor L5 and the capacitor C26 of the tank circuit 62 are selected so that the super-regenerative detector 48 is sensitive only to RF energy at approximately 380.55 Mhz ±50 Khz, which corresponds to the frequency of the transmitter 10. Accordingly, amplitude modulated RF energy between 380 Mhz and 381 Mhz received at the input 62 of the tank circuit 48 will be detected while RF energy outside of the frequency range will have no effect on the desired operation.

The output of the transistor Q4 is developed across the resistor R24 which provides the output signal voltage level for coupling into the next stage. The resistor R25 connected to the common junction between the inductor L6 and the resistor R24 forms an isolation resistance for supplying the output of the super-regenerative detector 48 to the input of the pulse differentiator block 50 without loading the signals present across R24. When a transmitter signal is received, the super-regenerative detector 48 output is a stable source of 100 KHz pulses, thus, the input to the pulse differentiator block 50 is present and follows the pulse width modulation of the carrier signal.

Alternatively, a super-regenerative type receiver 12 need not be used. For example, the front end of the receiver 12 which includes the antenna 47, the amplifier block 46, and the super-regenerative detector block 48, may be replaced with a super-heterodyne receiver. In addition, in alternative systems using an infra-red, optical, or other communication medium, an infrared receiver, a fiber optic receiver, or any other suitable receiver capable of receiving corresponding coded transmitter signals may be used.

The pulse differentiator block 50 includes an operational amplifier U3, resistors R29–R31, and capacitors C29–C31. Operational amplifier U3 is configured as a self-centering high-gain comparator acting as a differentiator. The input to the differentiator block 50, provided by the output of the super-regenerative detector block 48 through the resistor R25, connects to the common junction between the resistors R29 and R30. The resistors R29 and R30 connect to an inverting input 70 and a non-inverting input 72 of the operational amplifier U3, respectively. The capacitor C29 is connected from the junction of the resistors R29 and R30 to ground while the capacitor C30 provides an integrated level of 100 KHz pulses to the non-inverting input 72 of the operational amplifier U3. The resistor R31 provides feedback for the operational amplifier U3 by coupling an output 74 of the operational amplifier to the non-inverting input 72. The capacitor C31 is coupled between +3VDC and ground.

Typically, the resistors R29 and R30 are chosen to be of equal value. Only the difference between signals present on the inverting 70 and non-inverting input 72 of the operational amplifier U3 are amplified. The capacitor C30 provides an averaging function so that the 100 KHz pulse signals present at the non-inverting input 72 of the operational amplifier U3 charges the capacitor C30 to an average value. Thus, signals entering the differentiator block 50 through the resistor R25 charge the capacitor C30, which tends to hold the long term charge at the non-inverting input 72 of the operational amplifier U3. Consequently, such short term changes on the inverting input 70 cause the operational amplifier U3 to differentiate the signal. Since the capacitor C30 holds an average charge over time, any change in input signal causes a corresponding change in voltage across the input of the operational amplifier U3. Thus, a change in signal voltage over time is detected at the inputs to the operational amplifier U3, and that difference is amplified and an output signal 74 is generated. The gain of the operational amplifier U3 is governed by the value of the feedback resistor R31 divided by the value of R29 (e.g. a gain of 68 in the illustrated embodiment).

The output of the pulse differentiator block 50 is coupled to the pulse shaper block 52 through a coupling capacitor C32, connected as shown, from the output of the amplifier U3 to an inverting input 80 of an operational amplifier U4. The pulse shaper block 52 includes the operational amplifier U4, resistors R32–R36, and capacitors C32 and C33. This pulse shaper 52 is essentially a comparator circuit which produces a sharp square wave output suitable for input into a digital device. A connection to +3VDC and ground supplies power to the operational amplifier U4, as is well known in the art.

The inverting input 80 of the operational amplifier U4 is also coupled to the resistor R32, while the non-inverting input 82 of the operational amplifier U4 is coupled to the resistor R33. The other ends of the resistors R32 and R33 are connected together and are further coupled to a reference voltage derived from the +3VDC through the resistor R34, as shown. The common junction between the resistors R32, R33, and R34 are additionally coupled to ground through the parallel combination of the resistor R35 and the capacitor C33 to provide a stable voltage reference for U4. The resistor R36 connected between the non-inverting input 82 and an output 84 of the operational amplifier U4 provides the required hysteresis.

The input signal to the pulse shaper block 52 received at the inverting input 80 of the operational amplifier U4 is approximately 600 millivolts and swings about 100 millivolts when the output of the pulse differentiator circuit 50 changes state in response to a received RF signal 60. When the signal present at the inverting input 80 of the operational amplifier U4 exceeds the reference voltage present at the non-inverting input 82, the operational amplifier saturates and provides an output at a digital logic low level. Otherwise a digital high logic level is generated on the output 84 of the operational amplifier U4. This digital output signal is coupled, as shown, to the microprocessor 40.

In the illustrated embodiment of FIG. 5, the microprocessor 40 comprises an 8-bit EPROM based CMOS microprocessor U5, as is well known in the art. The microprocessor U5 is a model PIC16C54LP manufactured by Microchip Technologies, as disclosed publication DS30015H from Microchip Technologies, and is identical to microprocessor U1 shown in FIGS. 2 and 3.

A clock circuit 42 includes a crystal X2 connected across microprocessor inputs OSC1 and OSC2. A capacitor C34 is connected from the terminal of the crystal X2 that is connected to microprocessor pin OSC1 to ground, while a capacitor C35 is connected from the other end of the crystal to ground. The crystal X2, and the capacitors C34 and C35 determine the oscillator clock reference for the microprocessor U5, as is well known in the art.

Analarm block 54 includes transistors Q5 and Q6, resistors R37–R38, a capacitor C36, a diode D6, and an audio indicator 56, as shown. A microprocessor I/O pin RB7 is coupled to the base of the transistor Q6 through the resistor R38 controls operation of the audio alarm circuit 54. The microprocessor I/O pin RB7 turns the alarm indicator 56 on and off by providing a logic high and logic low, respectively, to the base of the transistor Q6. The collector of the transistor Q6 is coupled to the base of the transistor Q5, while the emitter of the transistor Q6 is grounded. The collector of the transistor Q5 is coupled to the base of the transistor Q6 through the series combination of the resistor R37 and the capacitor C36.

The collector of the transistor Q5 is connected to one end of the audio indicator 56, which may be a moving coil type audio device, such as a miniature speaker, as is well known in the art. However, any suitable audio or visual indicator which alerts the user may be used. The collector of the transistor Q5 is additionally connected to the cathode of the diode D6 while the anode of the diode D6 is connected to the other end of the audio indicator 56 and ground. Transistor Q5 and Q6 form a transistor oscillator circuit that is turned on and off by appropriate logic levels supplied by the microprocessor I/O pin RB7. The transistors Q5 and Q6 provide the drive current necessary to activate the audio indicator 56 while the capacitor C36 and the resistor R37 determine the frequency of oscillation, and hence, the tone of the audio output.

A battery circuit 44 (two blocks are shown connected together to form the battery circuit), includes two conventional batteries B3 and B4 connected in series to supply +3VDC to the receiver 12 in the illustrated embodiment. This circuit is similar to the battery circuit 24 shown in FIGS. 2 and 3. The common connection to the +3 volt supply point is labeled +3VDC. Power is supplied to the microprocessor U5 through a power pin Vdd while a ground pin Vss completes the circuit. The battery circuit 44 couples to microprocessor I/O pins RA0 and RA1, and includes resistors R39–R41, a zener diode D7, and a transistor Q7. The resistor R41 couples the collector of transistor Q7 to its base thereby providing a bias voltage. The junction between the collector of the transistor Q7 and the resistor R41 is connected to +3VDC. The base of the transistor Q7 is coupled to the microprocessor I/O pin RA0 through the series combination of the resistor R39 and the zener diode D7. Additionally, the emitter of the transistor Q7 is connected to the microprocessor I/O pin RA1 which is further coupled to ground through the resistor R40.

The capacitors C37, C38, and C39 are connected between +3VDC and ground to provide power storage for supplying power to the receiver circuit 12 for a limited period of time when the batteries B3 and B4 are removed. During that period of time, the microprocessor U5 will retain all program and memory functions for a period of about five minutes.

In operation, the battery testing operation is initiated periodically under microprocessor control when the microprocessor U5 lowers the I/O pin RA0 causing the transistor Q7 to conduct. This places the battery voltage +3VDC across the resistor R40, which acts as a test load. If the voltage drop across the resistor R40 is sufficient to cause a high logic level to be read on the microprocessor I/O pin RA1, the battery is considered to be functional. The resistor R39 sets the hysteresis point for the battery circuit.

A microprocessor I/O pin RTCC connected to +3VDC enables an internal clock counter of the microprocessor 40 (U5). A master clear input MCLR of the microprocessor 40 (U5) connects to a common connection between a capacitor C40 and a resistor R42. The other end of the resistor R42 connects to +3VDC while the other end of capacitor C40 is grounded. This supplies a properly shaped reset pulse to the microprocessor U5 upon application of power, as is well known in the art. In addition, the microprocessor 40 (U5) supplies a selectively enabled voltage +Vs through a limiting resistor R43 from an output port RA2 to the amplifier block 46. As previously described, this allows power to the amplifier 46 to be selectively turned-off under microprocessor control to conserve power.

A first terminal of a motion sensitive switch 86 is connected to a microprocessor I/O pin RB4 while the other end of the switch is pulled-up to +3VDC through a resistor R44. The junction between the resistor R44 and one terminal of the motion sensitive switch 86 is coupled to a microprocessor I/O pin RB5. The switch 86 may be a mercury switch or any other suitable motion sensitive device as are well known in the art.

In operation, when the receiver 12 is stationary, the switch 86 is in one particular state that is read and stored by the microprocessor 40 (U5). When the transmitter 10 broadcasts its identification code and the receiver 12 responds by activating the audio alarm 56, the user may locate the receiver and terminate the audio alarm by moving or shaking the receiver. This shaking or moving the receiver causes the motion sensitive switch 86 to change states. Such a change in state is sensed by the microprocessor 40 (U5) which then terminates the audio alarm under program control. Physically shaking the receiver 12 may cause the motion sensitive switch 86 to change states many times. Such switch "bounce" is properly interpreted by the microprocessor 40 (U5) as motion of the receiver. Table 2 provides examples of typical component values and part numbers, where applicable, for the embodiment of the receiver shown in FIG. 5.

TABLE 2

| DESIGNATION | TYPE | VALUE |
|---|---|---|
| AUD1 | AUDIO INDICATOR | 16Ω |
| ANT1 | ANTENNA | WIRE |
| B3 | BATTERY | +1.5 V |
| B4 | CAPACITOR | +1.5 V |
| C20 | CAPACITOR | 330 pf |
| C21 | CAPACITOR | 330 pF |
| C22 | CAPACITOR | 1 nF |
| C23 | CAPACITOR | 0.5 pF |
| C24 | CAPACITOR | 6.0 pf |
| C25 | CAPACITOR | 33 pF |
| C26 | CAPACITOR | 3–10 pF |
| C27 | CAPACITOR | 390 pf |
| C28 | CAPACITOR | 4 pF |
| C29 | CAPACITOR | 1 nF |
| C30 | CAPACITOR | 1 uF @ 5 VDC |
| C31 | CAPACITOR | 1 nF |
| C32 | CAPACITOR | 1 nF |
| C33 | CAPACITOR | 10 nF |
| C34 | CAPACITOR | 22 pF |
| C35 | CAPACITOR | 22 pF |
| C36 | CAPACITOR | 3.3 nF |
| C37 | CAPACITOR | 68 uF @ 6 VDC |
| C38 | CAPACITOR | 1 nF |
| C39 | CAPACITOR | 22 uF @ 6 VDC |
| C40 | CAPACITOR | 10 nF |
| D5 | DIODE | MMBD914XT1 |
| D6 | DIODE | MMBD914XT1 |
| D7 | ZENER DIODE | BZX84C2V7PH |
| L5 | INDUCTOR | 21.6 nH |
| L6 | INDUCTOR | 10 uH |

TABLE 2-continued

RECEIVER COMPONENTS

| DESIGNATION | TYPE | VALUE |
|---|---|---|
| Q3 | NPN TRANSISTOR | FMMT918CT |
| Q4 | NPN TRANSISTOR | FMMT918CT |
| Q5 | PNP TRANSISTOR | FMMT2907A |
| Q6 | NPN TRANSISTOR | MMST2222 |
| Q7 | PNP TRANSISTOR | FMMT2907A |
| R20 | RESISTOR | 51 KΩ |
| R21 | RESISTOR | 1 KΩ |
| R22 | RESISTOR | 22 KΩ |
| R23 | RESISTOR | 270Ω |
| R24 | RESISTOR | 6.8 KΩ |
| R25 | RESISTOR | 10 KΩ |
| R26 | RESISTOR | 39 KΩ |
| R27 | RESISTOR | 75 KΩ |
| R28 | RESISTOR | 3.9 KΩ |
| R29 | RESISTOR | 100 KΩ |
| R30 | RESISTOR | 100 KΩ |
| R31 | RESISTOR | 6.8 MΩ |
| R32 | RESISTOR | 470 KΩ |
| R33 | RESISTOR | 10 KΩ |
| R34 | RESISTOR | 47 KΩ |
| R35 | RESISTOR | 47 KΩ |
| R36 | RESISTOR | 6.8 MΩ |
| R37 | RESISTOR | 10 KΩ |
| R38 | RESISTOR | 220 KΩ |
| R39 | RESISTOR | 3.9 KΩ |
| R40 | RESISTOR | 39 KΩ |
| R41 | RESISTOR | 10 KΩ |
| R42 | RESISTOR | 39 KΩ |
| R43 | RESISTOR | 3.9 KΩ |
| R44 | RESISTOR | 47 KΩ |
| SW2 | MOTION SWITCH | DURAKOOL-4859 |
| U3 | OPERATIONAL AMPLIFIER | MAX407CSA |
| U4 | OPERATIONAL AMPLIFIER | MAS407CSA |
| U5 | MICROPROCESSOR | PIC16C54LP |
| X2 | CRYSTAL | 32.768 Khz |

Figure 6:
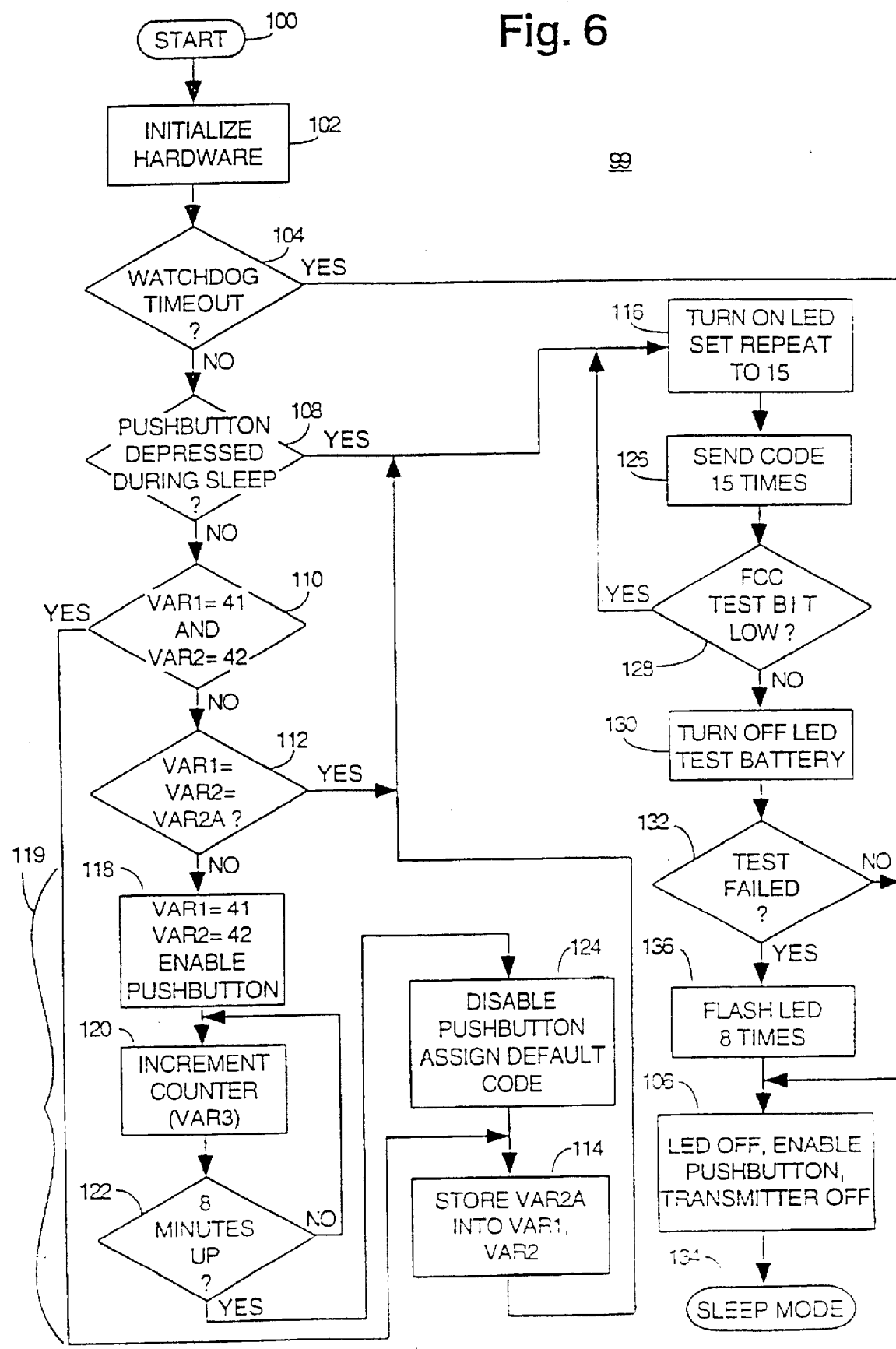
FIG. 6 is a flowchart illustrating one embodiment of the transmitter serialization method according to the present invention.

Referring now to FIG. 6, there is shown a flowchart illustrating a specific embodiment of the logical flow of a transmitter program 99 wherein the unique identification code is created and transmitted. The transmitter program 99 provides for a simple and low cost generation of unique identification codes. Creation of the unique identification code is referred to as transmitter serialization. Once generated, the transmitter identification codes are electronically accessible to other programmed devices, such as the receiver 12. The process of creating the identification code utilizes the fact that microprocessors and other computing devices generally require a synchronizing clock signal input. Given a sufficiently high clock rate, human controlled time intervals measured relative to that clock can be used to create essentially unique values.

The serialization process creates a pseudo-random identification code that is derived from a counter which is continuously incremented under software control. A user action, such as pressing the pushbutton 14, halts incrementing of the counter to yield a unique identification number.

However, the transmitter program 99 is not a truly linear procedure as it might appear from the flowchart of FIG. 6. The transmitter program 99 may be entered due to several different occurrences, all causing a microprocessor reset. In the illustrated embodiment, such occurrences include: 1) initial application of power causing a power-up reset, 2) depression of the pushbutton 14 on the transmitter 10, and 3) a watchdog timeout.

The transmitter program 99 begins as shown in step 100. Next, various sections of hardware are initialized, such as registers, memory locations, I/O ports, and the like, as illustrated in step 102. As indicated by step 104, the software determines whether entry into this routine was caused by a watchdog timeout. Step 104 is an error condition and should rarely occur. If, however, such an event does occur, the program branches to step 106. If entry into the transmitter program 99 was not caused by a watchdog timeout, a determination is made as to whether entry was caused by depression of the pushbutton 14 while in the sleep state, as shown in step 108.

One feature of the microprocessor 20 (U1) is the ability to enter a "sleep state" where power consumption is significantly reduced, yet memory functions are retained. The microprocessor 20 "awakes" or exits the sleep state when a master clear input (FIG. 3, microprocessor pin MCLR) is brought low. In one embodiment, the master clear input MCLR may be activated from a variety of sources as described above. Note that the pushbutton 14 may be depressed when the user wishes to locate the receiver 12 or may be depressed to program or synchronize the receiver.

If entry into the routine was not caused by depression of the pushbutton 14 while in the sleep state, as shown in step 108, then it is assumed that entry has been caused by a power-up reset condition caused by initial application of battery power or depression of the pushbutton 14 while synchronizing, as illustrated by the "no" branch of step 108. Next, in step, 110, a variable labeled variable1 (VAR1) is checked to see if it contains the value of 41, while a variable labeled variable2 (VAR2) is checked to see if it contains the value of 42. If variable1 and variable2 are not equal to the predetermined values, then the variables are checked to determine whether variable1 and variable2 are equal to a counter value, as shown in step 112. It should be noted that any suitable predetermined value may be used, and the software is not limited to the use of the values of 41 and 42 respectively.

The counter value is the value of an internal counter used to store the unique identification code. The value of the counter is written into variable1 and variable2, shown in step 114, as will be described below. Variable1, variable2, and the counter value (VAR2a) being equal indicates that the identification code had already been determined and saved, and that a momentary loss of power occurred, but not sufficient to cause a loss of memory. If the three values are equal, as shown by the "yes" arrow in step 112, the software branches to step 116.

If variable1, variable2 and the counter value are not all equal, then variable1 is set equal to 41, variable2 is set equal to 42, and the pushbutton 14 is enabled, as shown in step 118. Step 118 is the beginning of a serialization portion 119 of the transmitter program 99. Enabling the pushbutton 14 under software control allows subsequent depressions of the pushbutton to be sensed by the microprocessor. Next, as shown in step 120 the counter value is continuously incremented over a period of time of up to eight minutes, as illustrated in step 122. If eight minutes has not elapsed, as shown in the "no" branch of step 122, the software branches back to step 120 and continues to increment the counter. During the eight minute period of time, the user may depress the pushbutton 14 so as to create the unique identification code from the counter value, as will be described below.

The time between insertion of the batteries to when the user depresses the pushbutton 14 represents a unique period of time and thus, a unique counter value is generated that can be used as an identification code. Therefore, when the user depresses the pushbutton 14 within the eight minute period of time, the serialization routine is interrupted and reentered, since depression of the pushbutton causes a master reset occurrence. However, during this reentry, all memory values previously saved remain intact and indicate what actions have already been performed. Thus, when step 110 is again reached, variable1 does equal 41 and variable2 does equal 42, indicating that code creation was in progress at the time the pushbutton 14 was depressed. Accordingly, as shown in the "yes" branch of step 110, the routine branches to step 114 where the counter value is stored into variable1 and variable2, respectively, as the unique identification code. If the user does not depress the pushbutton 14 within the eight minute period of time, as indicated in step 122, at the end of eight minutes the pushbutton 14 is disabled as shown in step 124, and the current value of the counter is assigned as the default identification code.

After either the default identification code has been assigned, or a counter value has been stored in response to a pushbutton 14 depression, the program continues at step 116. To summarize, step 116 may be reached through several different occurrences. First, the pushbutton 14 may have been depressed while transmitter is in the sleep state, as shown by the "yes" branch of step 108. Second, if variable1 and variable2 and the count value are all equal, as shown in the "yes" branch of step 112, a brief power failure causing a master reset without loss of memory is indicated. Third, a branch from step 114 after creation of the initial identification code causes the software to branch to step 116.

The serialization portion 119 of the transmitter program 99 begins at step 118, ends at step 114, and includes intermediate steps 120,122, and 124. To perform the serialization steps, two consecutive entries into the transmitter program 99 must have occurred. The first entry occurs when the batteries are initially installed with power completely drained from the transmitter. During this first entry, steps, 100,102,104,108, 110, 112,118, 120, and 122 are performed with steps 120 and 122 being continuously repeated until either eight minutes has lapsed (step 122) or the pushbutton 14 is depressed.

Depressing the pushbutton 14 while executing steps 120 and 122 of the serialization portion 119 causes another reset and subsequent reentry into the receiver program 99. During this second entry, steps 100, 102, 104, 108, 110, and 114 are executed. The program does not follow the "yes" branch of step 108 since that branch is only followed while the transmitter is in the sleep state during depression of the pushbutton 14. During steps 120 and 122 the transmitter is obviously not in the sleep state. Thus, the second depression of the pushbutton 14 causes the serialization portion 119 to fully execute and generate the unique identification code, as shown in step 114.

Once the software reaches step 116, the LED 16 is turned-on and a repeat counter is initialized to the value 15. Next, as shown in step 126, the identification code (the counter value) is transmitted 15 times. Next, if an FCC test bit is set low, as shown in step 128, the software continuously branches back to step 116 to repeat transmission of the identification code. If the FCC test bit is not set low, the LED 16 is turned-off and a battery test is performed, as indicated in step 130. If the battery test is successful, as shown in the "no" branch of step 132, the LED 16 is turned-off, the pushbutton 14 is enabled, and the transmitter 10 is turned-off to conserve power, as shown in step 106.

Next, the transmitter 10 is placed into sleep mode, as illustrated in step 134, to await the future depressions of the pushbutton or other actions which may cause a master clear reset. If the battery test fails, as shown in the "yes" branch of step 132, the LED 16 is flashed eight times, as shown in step 136, and the program branches to step 106.

It should be noted that this process generates pseudo-random identification codes that are neither consecutive nor related. While not an absolutely unique number, such a number is effectively unique since the time between when the user installs the batteries and presses the pushbutton 14 is highly likely to be different each time the user performs the operation. In the unlikely event that the identification code is not unique, the serialization process can be repeated to yield the required unique identification code.

Once the unique transmitter identification code has been created and transmitted, the receiver must be programmed to respond only to that transmitter's identification code. The process of coordinating the receiver to the unique identification code is called receiver synchronization. Please refer to Appendix A showing a complete source code listing of the transmitter program written in assembly language suitable for the PIC16C54LP microprocessor.

Figure 7A:
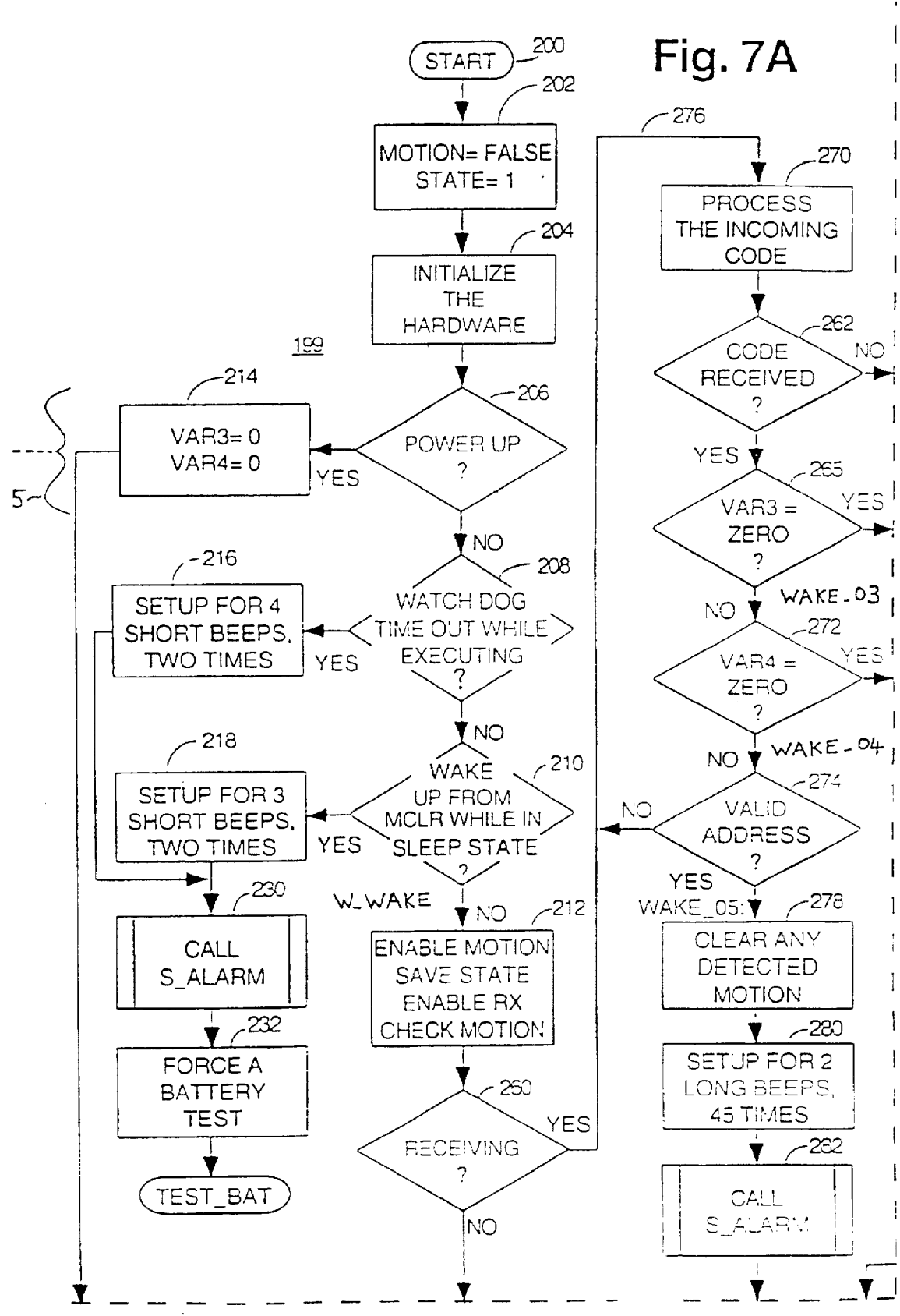
FIGS. 7A-7C are flowcharts illustrating one embodiment of the receiver synchronization method according to the present invention.
Figure 7B:
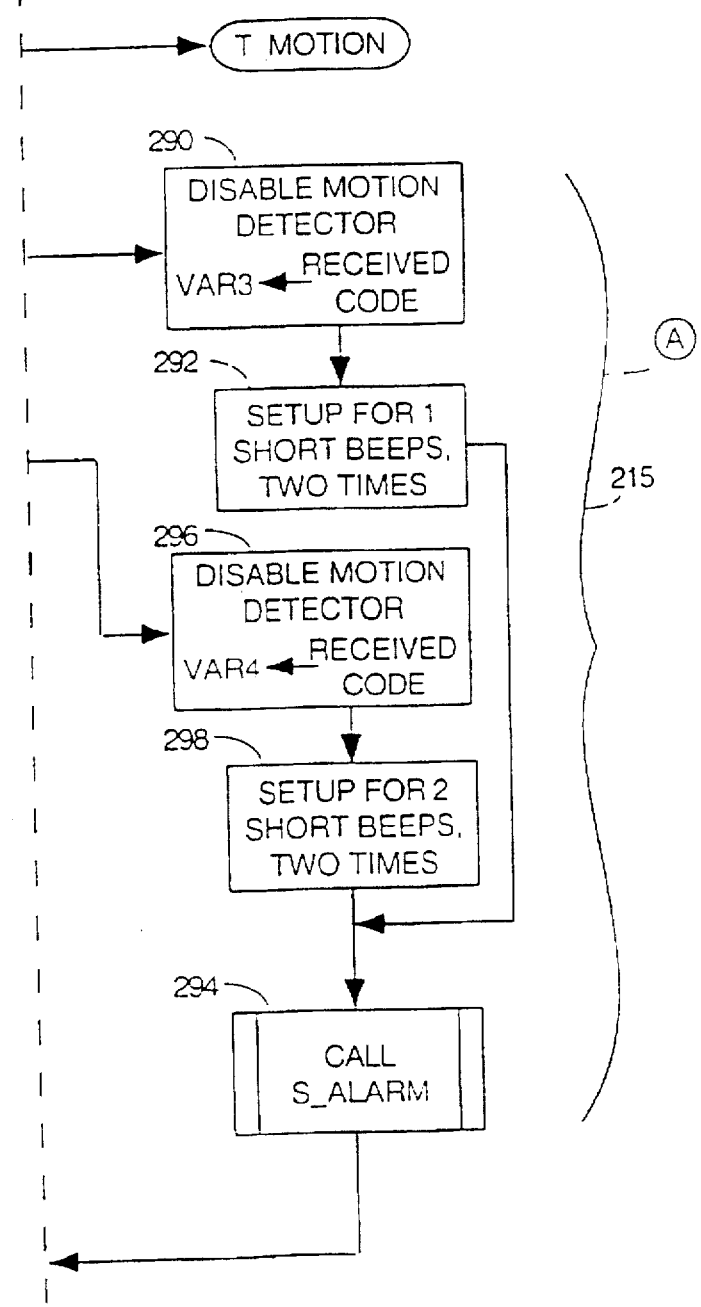
Figure 7C:
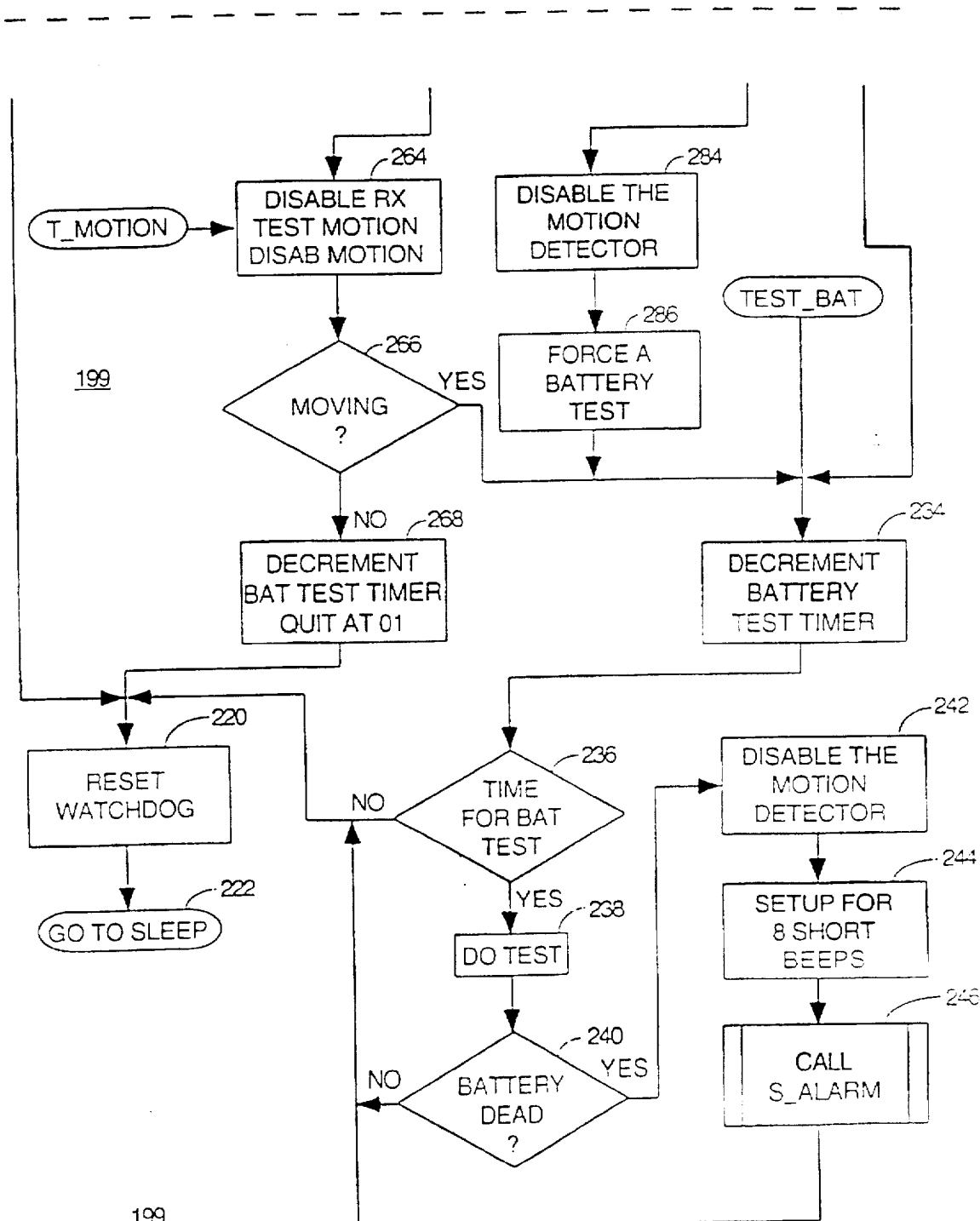

Referring now to FIGS. 7A–7C, there are flowcharts showing a specific embodiment of the logical flow of the receiver program 199. However, the receiver program 199 is not truly a linear program as might appear to be indicated by the flow chart since the program may be entered due to several different occurrences, all causing a microprocessor reset. First, a true power-up reset through application of initial electrical power may cause entry into the routine. Second, a watchdog timer may expire while the program is executing (not in sleep state) causing a reset and subsequent re-entry into the routine. Third, the microprocessor 40 (U5) may be brought out of a sleep state by a master clear occurrence, and fourth, the routine may be entered due to a periodic reset caused by a watchdog timer while the receiver is in the sleep state (not executing).

The illustrated embodiment of the receiver program 199 begins as shown in step 200. A variable "motion" is set to false indicating that no motion is sensed from the motion sensitive switch 86, as illustrated in step 202. Next, various sections of the hardware are initialized such as registers, memory locations, I/O ports, and the like, as indicated in step 204.

As shown in steps 206, 208, 210 and 212, the type of the reset which caused entry into the routine is determined. In step 206, if a reset was caused by a true power-up condition, such as when the batteries are inserted, process control branches to step 214. Step 214 represents the initial step of a receiver synchronization portion 215 of the receiver program 199. If the watchdog timer has timed-out while the program is executing, as shown in step 208, causing a reset, the receiver program 199 branches to step 216. If a reset occurs due to the microprocessor 40 (U5) being brought out of a sleep condition due to a master clear, the program branches to step 218, as illustrated by the "yes" branch of step 210. This is an error condition and should rarely occur. If neither step 206, step 208, nor step 210 indicate the cause of the reset leading to entry of the routine, then entry into the routine must have been caused by the periodic reset caused by the watchdog timer, which occurs approximately every two seconds, as shown in step 212. The watchdog timer causes the microprocessor 40 (U5) to awake from a sleep state every two seconds to perform receiver processing, and thus, conserve power.

Referring back to step 206, if the reset was caused by a power-up reset, a variable labeled variable3 (VAR3) and a variable labeled variable4 (VAR4) are set to a value of zero and the program branches to step 220 where the watchdog timer is reset. Next, the microprocessor 40 (U5) is put into a sleep state to await a subsequent reset, as illustrated in step 222, indicating the end of the routine. A value of zero written into variable3 and variable4 indicates during a subsequent inspection of the variables that the receiver 12 has not yet been synchronized to the transmitter code and thus, will not respond to the transmitter 10. When variable3 and variable4 are later inspected during subsequent entry into the routine, a zero value directs the software to save the incoming code as the initial identification code and thus, the receiver will only respond to that code during subsequent receiver operations, as will be discussed hereinafter. The variable3 stores the identification code such that the receiver may respond to a first transmitter while variable4 stores a second identification code such that the receiver may respond to a second transmitter.

If the reset and subsequent entry into the routine was caused by a watchdog timeout while the program is executing, as shown in step 208, the audio indicator parameters are set to produce two sets of four short beeps, as shown in step 216. Next, the program branches to step 230 where the alarm subroutine is called to output the beeps according to the previously specified parameters. Occurrence of a watchdog timer time-out while the program is executing represents an error condition and should rarely, if ever, occur.

If the reset and subsequent entry into the routine was caused by a master clear while in the sleep state, as shown in step 210, the program branches to step 218 where the alarm routine parameters are set to produce two sets of three short beeps. The software then branches to the alarm subroutine to output the beeps according to the previously specified parameters, as shown in step 230. This is an error condition and indicates a temporary power failure sufficient to trigger a power-up reset, but not sufficient to cause memory loss.

After step 230, a battery test is performed, as shown in step 232 where the battery timer is set up as to force a battery test. Then the battery test timer is decremented in step 234, followed by a check to determine whether it is time to perform the battery test, as indicated in step 236. If it is not yet time to perform the battery test, as illustrated by the "no" branch of step 236, the process control branches to step 220 where the watchdog timer is reset. If it is time to perform the battery test, as shown in the "yes" branch of step 236, the battery test is performed, as indicated in step 238, and the test result is inspected, as shown in step 240. If the battery test is successful, the process control branches to step 220 where the watchdog timer is reset. However, if the battery test fails, as shown in the "yes" branch of step 240, the motion sensitive switch 86 is disabled, as illustrated in step 242, and the alarm subroutine parameters are set to produce one set of eight short beeps, as indicated in step 244. The alarm subroutine is then called, as shown in step 246, to output the audio tones, and the process control branches to step 220 where the watch dog timer is reset.

Referring back to step 212, the routine has reached this step when the periodic watchdog timer, occurring every two seconds, has triggered a microprocessor reset while in the sleep state. In step 212, the motion sensitive switch 86 is enabled, the receiver 12 is enabled (by activating +Vs), and a check is performed to determine if the motion sensitive switch has changed states.

When the receiver is enabled and if RF data is received, as indicated in step 260, the program branches to step 270 where the receiver 12 processes the received data. In step 260, the receiver 12 monitors the predetermined frequency range of between 380 Mhz to 381 Mhz searching for any RF activity transmitted by the transmitter 10. However, a frequency range of between 300 Mhz to 3000 Mhz may be used. If the receiver 12 does not detect any RF activity, as indicated by the "no" branch of step 260, step 264 is executed wherein the receiver 12 is disabled, the state of the motion sensitive switch is tested and recorded, and the motion sensitive switch 86 is disabled.

Next, if motion has not been detected, as shown in step 266, battery test timer is decremented, as shown in step 268. The battery test timer governs the minimum time interval allowed between consecutive battery test operations. After step 268, the program advances to step 220 where the watchdog timer is reset. If motion is detected, as illustrated by the "yes" branch of step 266, process control branches to step 234 to perform the battery test.

If the receiver 12 receives an RF signal, as indicated by the "yes" branch of step 260, the program branches to step 270 where the RF signal is processed. In step 270, the incoming RF signal is processed. First, the program looks for the preamble, then examines the identification code to try to find logical ones and logical zeros corresponding to an identification code. The transmitted preamble consists of 30 milliseconds "on" followed by 10 milliseconds "off." The preamble is repeated five times by the transmitter 10. Once the preamble has been received, the receiver 12 assembles and stores the transmitted identification code.

If it is determined that the received RF signal represents an identification code, as shown by the "yes" branch of step 262, variable3 is inspected to determine if it contains a value of zero, as illustrated in step 265. If variable3 does not contain a value of zero, then variable4 is checked to determine if it contains a value of zero, as shown in step 272. If neither variable contain the value of zero, as indicated in the "no" branch of step 272, then it is assumed that the receiver has already been synchronized and that the unique identification code transmitted by the transmitter 10 has already been received and saved in the memory (variable3 and variable4) of the receiver 12.

Next, as shown in step 274, since variable3 and variable4 do not equal the value of zero, and therefore, must contain one of the identification codes corresponding to the transmitter 10, the received code is checked for validity. If the code is invalid, as shown by the "no" branch of step 274, the program continues to cycle looking for incoming codes, as illustrated by the branch labeled 276 until a valid identification code is received or the RF activity ceases.

If the identification code is determined to be valid, as shown by the "yes" branch of step 274, the processor executes step 278 where the motion variable is cleared. Next, the alarm subroutine parameters are set to issue forty-five sets of two long beeps, as indicated in step 280. The alarm subroutine is then called, as illustrated in step 282 to issue the previously specified audible parameters. The audio tones last for approximately five minutes which allows the user to locate the receiver 10 and the article to which it is attached. Next, the motion detector is disabled, and the battery test timer is set such that in step 236, a battery test will occur, as shown in steps 284 and 286.

Returning now to step 265, if variable3 contains a value of zero, indicating that a valid identification code has not yet been saved while the incoming code just received is an identification code, the motion sensitive switch 86 is disabled, and the received code is saved in variable3 as the identification code corresponding to a first transmitter, as shown in step 290. Step 290 represents another step of the serialization portion 215 of the receiver program 199 in addition to step 214 described above. Next, the alarm subroutine parameters are set to issue two sets of a single short beep, as illustrated in step 292, and the alarm subroutine is called, as indicated in step 294. This informs the user that the receiver 12 has been properly synchronized with the first identification code.

If variable3 does not contain the value of zero, as shown in the "no" branch of step 265, then variable4 is checked to determine whether it contains a value of zero, as shown in step 272. If variable4 does contain a value of zero, indicating that the second identification code has not yet been saved, the motion detector 86 is disabled and the incoming code is saved in variable4, as illustrated in step 296. This represents the new identification code corresponding to a second transmitter or the first identification code, if only one transmitter is used. Next, as shown in 298, the alarm subroutine parameters are set to issue two sets of two short beeps and the alarm subroutine is called, as shown in step 294.

In summary, the synchronization portion 215 of the receiver program 199 includes steps 214, 290, 292, 296, 298, and 294. Synchronization actually requires three consecutive entries into the receiver program 199. The first entry occurs when batteries are initially installed with power completely drained from the receiver 12. During this first entry, the "yes" branch of step 206 is followed which indicates a power-up condition. The only other valid entry into the receiver program 199 occurs due to a master clear condition while in sleep state, as illustrated in the "no" branch of step 210. Thus, the "yes" branch of both steps 208 and 210 should not occur and represents an error condition. The second entry into the receiver program 199 occurs when the microprocessor wakes up due to a master clear condition while in a sleep state, as shown by the "no" branch of step 210. During this entry, a valid identification code is received and the program eventually follows the "yes" branch of step 260 where the unique identification code is eventually stored in variable3 (VAR3), as illustrated in step 290. During a third entry into the receiver program 199, the "no" branch of both steps 208 and 210 are followed as well as the "yes" branches of steps 260 and step 272 where the second code is stored in VAR4 as illustrated in the step 295. This completes the synchronization process. During subsequent entry into the receiver program 199, the receiver responds to the transmitted identification code and alerts the user.

There is a sufficient overlap in the period of time during which the transmitter 10 continuously transmits the identification code and the period of time during which the receiver 12 is in the sleep state. The period of time that the identification code is transmitted is between five and seven seconds, which is longer than the 2.5 seconds that the receiver sleeps. This ensures a degree of overlap necessary to synchronize the receiver 12. Note, that any suitable time period may be used as long as the time during which the transmitter broadcasts is greater that the sum of the receiver sleep time and the receiver scan time. The combined procedures of transmitter serialization and receiver synchronization may be referred to as "parenting". If the parenting process is not completed after installation of the batteries, such as when the receiver 12 is not within range of the transmitter 10, (for example, if the receiver is more than one hundred feet from the transmitter), it may be repeated at a later time by depressing the pushbutton 14 on the transmitter 10 while the receiver 12 is within range. In this situation, the transmitter code will have already been created and saved in the transmitter 10, but the receiver will be blank, i.e. a value of zero will be present in both variable3 and variable4. Thus, the receiver 12 will periodically scan for a valid identification code, and when received, will accept the first two identification codes and save them in memory. Please refer to Appendix B showing a complete source code listing for the receiver program written in assembly language suitable for the PIC16C54LP microprocessor.

The above-described parenting process is not, however, limited to receiver-transmitter devices directed to remote locating devices. It is contemplated that the serialization and synchronization process may be applied in a variety of applications such as: serializing and synchronizing garage door or gate activating remote controls and base units to prevent unauthorized operation; serializing and synchronizing cordless telephone handsets and base units to prevent interference from adjacent cordless telephone sets; serializing and synchronizing wireless alarm sensors and control units to prevent interference from other sensors; serializing and synchronizing computer network elements to prevent unintended element interaction; serializing and synchronizing cellular telephones or pagers; and serializing and synchronizing other manufactured equipment including automobiles and other vehicles.

Multiple transmitter and receiver operation is also possible where one transmitter 10 can control several different receivers 12, where several transmitters may control the same receiver, or any combination of transmitters and receivers may be used. If a single transmitter 10 is serialized in the presence of more than one unsynchronized receiver 12, then each of those receivers will receive, verify, and store the same transmitted identification code, and will then respond to that particular transmitter.

The reverse situation is also possible where a single receiver 12 can respond to more than one transmitter 10. In one embodiment, each receiver 12 can store multiple (i.e., two, three, etc.) identification codes, thus, can respond to multiple transmitters. The above described receiver synchronization process may be required for additional transmitters until all of the receiver memory allocated for storage of desired transmitter identification codes has been filled. Thus, sequentially serializing different transmitters 10 in the presence of one receiver 12 permits that receiver to respond to each serialized transmitter.

In an alternate embodiment, if only a single transmitter 10 and receiver 12 are used, the receiver synchronization process will terminate within a predetermined period of time, such as four minutes and the receiver will not continue to search for additional transmitter identification codes. Upon termination of the four minute time period, after having received a first transmitter identification code, the receiver 12 copies the identification code from a memory location (variable3) into the second unused memory location (variable4).

In the preferred embodiment, each receiver allocates two memory locations for storage of two transmitter identification codes. Thus, each receiver may respond to a maximum of two different transmitters 10. However, additional memory locations may be allocated such that a single receiver 12 can respond to a greater number of transmitters 10.

If one transmitter 10 is to be used with multiple receivers 12, the receivers may be synchronized simultaneously during the transmitter serialization stage as described above. However, if the second receiver was unavailable when the first receiver was synchronized, then the pushbutton 14 is depressed a second time in the presence of the second receiver.

A specific embodiment of an electronic location device according to the present invention has been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

APPENDIX A

```
;***********. ************************  ;*******
;
;          PIC16C54LP RemLo Transmitter Program
;
;*************************************************************
;
; Copyright 1994 Schoepferisch Aeusserung Anstalt
;              All Rights Reserved
;
;        Copyright 1994 LambdaMetrics,
;        P.O. Box 1029 Cedar Park, Tx. 78630
;              All Rights Reserved
;
;        Author: Pat Bibb, LambdaMetrics
;        For   : Sidney Chen, SC Management
;
;                Version : 1.50
;                Checksum: C9EE
;                Date    : 09-07-94
;
;************************************************************* lo_cnt    equ     0x08
p_stat    equ     0x09
rotate    equ     0x0a
addr_0    equ     0x0b
addr_1    equ     0x0c
addr_2    equ     0x0d
e_code    equ     0x0e
a_count   equ     0x0f
s_count   equ     0x10
b_count   equ     0x11
wait      equ     0x12
wait2     equ     0x13
sh_wait   equ     0x14

RTCC      equ     01
PC        equ     02
STATUS    equ     03
FSR       equ     04
PORT_A    equ     05
PORT_B    equ     06

C         equ     00
DC        equ     01
Z         equ     02

P_DOWN    equ     03
PD        equ     03
T_OUT     equ     04
TO        equ     04

F         equ     1
W         equ     0

LSB       equ     0
BT0       equ     0
BT1       equ     1
BT2       equ     2
BT3       equ     3
BT4       equ     4
BT5       equ     5
BT6       equ     6
BT7       equ     7
MSB       equ     7
```

```
TEST_B    equ    BT4
TX_DATA   equ    BT0

MCLR_ON   equ    BT3
LED       equ    BT2
BAT_TST   equ    BT1
BAT_ON    equ    BT0

POWER     equ    00001100b
MCLR      equ    00000100b
WDT_NS    equ    00001000b
WDT_S     equ    00000000b TRUE      equ    1
YES       equ    1
FALSE     equ    0
NO        equ    0 delay_1ms
          movlw  0x01
          movwf  lo_cnt
          nop
          nop
          retlw  0 delay_2ms
          movlw  0x01
          movwf  lo_cnt
          call   timer8
          retlw  0 delay_4ms
          movlw  0x03
          movwf  lo_cnt
          call   timer8
          retlw  0 delay_8ms
          movlw  0x07
          movwf  lo_cnt
          call   timer8
          retlw  0 delay_10ms
          movlw  0x09
          movwf  lo_cnt
          call   timer8
          retlw  0 delay_20ms
          movlw  0x13
          movwf  lo_cnt
          call   timer8
          retlw  0 delay_40ms
          movlw  0x28
          movwf  lo_cnt
          call   timer8
          retlw  0 delay_80ms
          movlw  0x51
          movwf  lo_cnt
          call   timer8
          retlw  0
```

```
delay_100ms
        movlw   0x65
        movwf   lo_cnt
        call    timer8
        retlw   0 delay_200ms
        movlw   0xcc
        movwf   lo_cnt
        call    timer8
        retlw   0 timer8
        nop
        nop
        nop
        nop
        nop
        decfsz  lo_cnt
        goto    timer8
        retlw   0 inc_address
        movlw   0xcb
        movwf   sh_wait
sh_loop
        incf    addr_0,F
        decfsz  sh_wait,F
        goto    sh_loop
        incf    addr_0,F
        retlw   0 start
        movlw   0x02
        tris    PORT_A
        bsf     PORT_A,MCLR_ON
        bsf     PORT_A,BAT_ON
        bsf     PORT_A,LED
        movlw   0xfe
        tris    PORT_B
        bcf     PORT_B,TX_DATA
        movf    STATUS,W
        movwf   p_stat
        rrf     p_stat,F
        rrf     p_stat,F
        rrf     p_stat,W
        andlw   0x03
        addwf   PC,F
        goto    rest_now
        goto    rest_now
        goto    mc_wake
```

```
           movlw   0x41
           subwf   addr_1,W
           btfss   STATUS,Z
           goto    power_1
           movlw   0x42
           subwf   addr_2,W
           btfss   STATUS,Z
           goto    power_1
           goto    set_addr
power_1
           movf    addr_0,W
           xorwf   addr_1,W
           btfss   STATUS,Z
           goto    dont_match
           movf    addr_0,W
           xorwf   addr_2,W
           btfss   STATUS,Z
           goto    dont_match
           goto    mc_wake
dont_match
           call    delay_200ms
           call    delay_200ms
           call    delay_200ms
           call    delay_200ms
           call    delay_200ms
           call    delay_200ms
           call    delay_200ms
           call    delay_200ms
           call    delay_200ms
           movlw   0x41
           movwf   addr_1
           movlw   0x42
           movwf   addr_2
           movlw   0x02
           tris    PORT_A
           bcf     PORT_A,MCLR_ON
           movlw   0x02
           movwf   wait2
inc_lp2
           movlw   0xf0
           movwf   wait
inc_loop
           bcf     PORT_A,LED
           call    inc_address
           call    inc_address
           bsf     PORT_A,LED
           call    inc_address
           call    inc_address
           call    inc_address
           call    inc_address
           call    inc_address
           call    inc_address
           call    inc_address
           call    inc_address
           decfsz  wait,F
           goto    inc_loop
           decfsz  wait2
           goto    inc_lp2
           movlw   0x02
           tris    PORT_A
           bsf     PORT_A,MCLR_ON
```

```
set_addr
        incf    addr_0,F
        bnz     set_addr2
        movlw   0x55
        movwf   addr_0
set_addr2
        movf    addr_0,W
        movwf   addr_1
        movwf   addr_2
mc_wake
        bcf     PORT_A,LED
        movlw   0x0f
        movwf   a_count
addr_lp
        movlw   0x05
        movwf   s_count
sync_lp
        bsf     PORT_B,TX_DATA
        call    delay_10ms
        call    delay_20ms
        bcf     PORT_B,TX_DATA
        call    delay_10ms
        decfsz  s_count,F
        goto    sync_lp
        movlw   0x08
        movwf   b_count
        movf    addr_0,W
        movwf   rotate
bit_lp
        bsf     PORT_B,TX_DATA
        rrf     rotate,F
        btfss   STATUS,C
        goto    send_0
        call    delay_10ms
send_0  call    delay_10ms
        bcf     PORT_B,TX_DATA
        call    delay_10ms
        decfsz  b_count,F
        goto    bit_lp
        decfsz  a_count,F
        goto    addr_lp
        btfss   PORT_B,TEST_B
        goto    mc_wake
        bsf     PORT_A,LED
        bcf     PORT_A,BAT_ON
        call    delay_200ms
        btfsc   PORT_A,BAT_TST
        goto    rest_now
        bsf     PORT_A,BAT_ON
        movlw   0x08
        movwf   a_count
low_loop
        bcf     PORT_A,LED
        call    delay_200ms
        call    delay_100ms
        bsf     PORT_A,LED
        call    delay_200ms
        call    delay_100ms
        decfsz  a_count,F
        goto    low_loop
```

```
motion
        btfsc    PORT_B,MOT_DET
        goto     state_1
state_0 btfss    state,BT0
        goto     done_now
        clrf     state
        movlw    0x01
        movwf    moved
        goto     done_now
state_1 btfsc    state,BT0
        goto     done_now
        movlw    0x01
        movwf    state
        movwf    moved
done_now
        btfsc    moved,BT0
        goto     we_moved
        retlw    0x00
we_moved
        retlw    0x01 s_alarm
        bcf      PORT_A,RX_ON
        movf     tone_3,W
        movwf    count
alarm_01
        movf     tone_0,W
        movwf    filter
        movf     tone_1,W
        movwf    rotate
alarm_lp
        clrwdt
        rrf      rotate,F
        bnc      alarm_off
        bsf      PORT_B,ALARM
        goto     alarm_timer
alarm_off
        bcf      PORT_B,ALARM
alarm_timer
        call     delay_200ms
        call     motion
        iorlw    0
        bz       alarm_02
        movlw    01
        subwf    tone_3,W
        bnz      alm_done
alarm_02
        decf     filter,F
        bz       test_lpcnt
        movlw    0x08
        subwf    filter,W
        bnz      alarm_lp
        movf     tone_2,W
        movwf    rotate
        goto     alarm_lp
test_lpcnt
        decf     count,F
        bnz      alarm_01
alm_done
        bcf      PORT_B,ALARM
        retlw    0x00
```

```
rest_now
        movlw   0xfe
        tris    PORT_B
        bcf     PORT_B,TX_DATA
        movlw   0x02
        tris    PORT_A
        bsf     PORT_A,BAT_ON
        bsf     PORT_A,LED
        bcf     PORT_A,MCLR_ON
        sleep org     01FFh
        goto    start

END
```

*APPENDIX B*

```
;*********************************** *********
;         PIC16C54LP RemLo Receiver Program
;**********************************************
;
; Copyright 1994 Schoepferisch Aeusserung Anstalt
;               All Rights Reserved
;
;        Copyright 1994 LambdaMetrics,
;     P.O. Box 1029 Cedar Park, Tx. 78630
;               All Rights Reserved
;
;        Author: Pat Bibb, LambdaMetrics
;        For   : Sidney Chen, SC Management
;
;               Version : 1.80
;               Checksum: A95B
;               Date    : 07-26-94
;**********************************************

RTCC      equ     01
PC        equ     02
STATUS    equ     03
FSR       equ     04
PORT_A    equ     05
PORT_B    equ     06 lo_cnt    equ     0x08
p_stat    equ     0x09
rotate    equ     0x0a
addr_1    equ     0x0b
addr_2    equ     0x0c
lp_cnt    equ     0x0d
filter    equ     0x0f
count     equ     0x10
bat_lp    equ     0x11
r_code    equ     0x12
tone_0    equ     0x13
tone_1    equ     0x14
tone_2    equ     0x15
tone_3    equ     0x16
bat_cnt   equ     0x17
moved     equ     0x18
state     equ     0x19

C         equ     00
DC        equ     01
Z         equ     02

P_DOWN    equ     03
PD        equ     03
T_OUT     equ     04
TO        equ     04

F         equ     1
W         equ     0
```

```
wake_05
        bcf     PORT_A,RX_ON
        clrf    moved
        movlw   0x00
        btfsc   PORT_B,MOT_DET
        movlw   0x01
        movwf   state
        movlw   L_ONE1
        movwf   tone_1
        movlw   L_ONE2
        movwf   tone_2
        movlw   L_ONE0
        movwf   tone_0
        movlw   L_ONE3
        movwf   tone_3
        call    s_alarm
        bsf     PORT_B,MOT_ENB
        clrf    moved
        movlw   01
        movwf   state
        movwf   bat_cnt
        movwf   bat_lp
test_bat
        decf    bat_cnt,F
        bnz     rest_now
        decf    bat_lp,F
        bnz     rest_now
        movlw   0x03
        movwf   bat_lp
        bcf     PORT_A,B_ENAB
        call    delay_200ms
        btfsc   PORT_A,B_TEST
        goto    rest_now
        bsf     PORT_A,B_ENAB
        clrf    moved
        movlw   0x01
        movwf   state
        movlw   S_ATE1
        movwf   tone_1
        movlw   S_ATE2
        movwf   tone_2
        movlw   S_ATE0
        movwf   tone_0
        movlw   S_ATE3
        movwf   tone_3
        call    s_alarm
rest_now
        bsf     PORT_A,B_ENAB
        clrwdt
        sleep org     01FFh
        goto    start

END
```

```
LSB      equ   0
BT0      equ   0
BT1      equ   1
BT2      equ   2
BT3      equ   3
BT4      equ   4
BT5      equ   5
BT6      equ   6
BT7      equ   7
MSB      equ   7

B_ENAB   equ   BT0
S_TEST   equ   BT1
RX_ON    equ   BT2

RD_RX    equ   BT1
MOT_ENB  equ   BT4
MOT_DET  equ   BT5
ALARM    equ   BT7

POWER    equ   b'00001100'
MCLR     equ   b'00000100'
WDT_NS   equ   b'00001000'
WDT_S    equ   b'00000000'

TRUE     equ   1
YES      equ   1
FALSE    equ   0
NO       equ   0

SYNCH_T  equ   0xcc
LONG_T   equ   0x7b
WT_HIGH  equ   0x14
WT_LOW   equ   0x37

S_ONE0   equ   0x06
S_ONE1   equ   b'00000001'
S_ONE2   equ   b'00000000'
S_ONE3   equ   2

S_TWO0   equ   0x08
S_TWO1   equ   b'00000101'
S_TWO2   equ   b'00000000'
S_TWO3   equ   2

S_THRE0  equ   0x0a
S_THRE1  equ   b'00000001'
S_THRE2  equ   b'00000101'
S_THRE3  equ   2

S_FOUR0  equ   0x0c
S_FOUR1  equ   b'00000101'
S_FOUR2  equ   b'00000101'
S_FOUR3  equ   2

L_ONE0   equ   0x10
L_ONE1   equ   b'00111111'
L_ONE2   equ   b'00111111'
L_ONE3   equ   0x5e S_ATE0   equ   0x10
S_ATE1   equ   b'01010101'
S_ATE2   equ   b'01010101'
S_ATE3   equ   1
```

```
delay_1ms
        movlw   0x01
        movwf   lo_cnt
        nop
        nop
        retlw   0
delay_2ms
        movlw   0x01
        movwf   lo_cnt
        goto    timer8
delay_4ms
        movlw   0x03
        movwf   lo_cnt
        goto    timer8
delay_8ms
        movlw   0x07
        movwf   lo_cnt
        goto    timer8
delay_10ms
        movlw   0x09
        movwf   lo_cnt
        goto    timer8
delay_20ms
        movlw   0x13
        movwf   lo_cnt
        goto    timer8
delay_40ms
        movlw   0x28
        movwf   lo_cnt
        goto    timer8
delay_80ms
        movlw   0x51
        movwf   lo_cnt
        goto    timer8
delay_100ms
        movlw   0x65
        movwf   lo_cnt
        goto    timer8
delay_200ms
        movlw   0xcc
        movwf   lo_cnt
timer8
        nop
        nop
        nop
        nop
        nop
        decfsz  lo_cnt
        goto    timer8
        nop
        nop
        retlw   0
```

61

```
wait_high
        movlw   WT_HIGH
        movwf   count
wait_hi
        btfsc   PORT_B,RD_RX
        goto    now_high
        decf    count
        bnz     wait_hi
        retlw   0x00
now_high
        movlw   0x00
        movwf   RTCC
        movlw   0x03
        movwf   filter
hi_loop
        btfss   PORT_B,RD_RX
        goto    wait_hi
        decf    filter,F
        bnz     hi_loop
        retlw   0x01 wait_low
        movlw   WT_LOW
        movwf   count
wait_lo
        btfss   PORT_B,RD_RX
        goto    now_low
        decf    count
        bnz     wait_lo
        retlw   0x00
now_low
        movf    RTCC,W
        movwf   count
        movlw   0x03
        movwf   filter
lo_loop
        btfsc   PORT_B,RD_RX
        goto    wait_low
        decf    filter,F
        bnz     lo_loop movlw   SYNCH_T
        subwf   count,W
        bnc     test_1
        retlw   0x01
test_1  movlw   LONG_T
        subwf   count,W
        bnc     test_0
        retlw   0x02
test_0  retlw   0x03
```

62

```
start
        movlw   0x01
        movwf   PORT_A
        movlw   0x02
        tris    PORT_A
        movlw   0x10
        movwf   PORT_B
        movlw   0x22
        tris    PORT_B
        movlw   0x0f
        option
        clrf    moved
        movlw   0x01
        movwf   state
        movf    STATUS,W
        movwf   p_stat
        rrf     p_stat,F
        rrf     p_stat,F
        rrf     p_stat,W
        andlw   0x03
        addwf   PC,F
        goto    w_wake
        goto    wd_time
        goto    mc_wake power_up
        movlw   0x00
        movwf   addr_1
        movwf   addr_2
        clrwdt
        sleep mc_wake
        movlw   S_THRE1
        movwf   tone_1
        movlw   S_THRE2
        movwf   tone_2
        movlw   S_THRE0
        movwf   tone_0
        movlw   S_THRE3
        movwf   tone_3
        call    s_alarm
        movlw   0x01
        movwf   bat_cnt
        movwf   bat_lp
        goto    test_bat wd_time
        movlw   S_FOUR1
        movwf   tone_1
        movlw   S_FOUR2
        movwf   tone_2
        movlw   S_FOUR0
        movwf   tone_0
        movlw   S_FOUR3
        movwf   tone_3
        call    s_alarm
        movlw   0x01
        movwf   bat_cnt
        movwf   bat_lp
        goto    test_bat
```

63

```
w_wake
        bcf     PORT_B,MOT_ENB
        movlw   0x00
        btfsc   PORT_B,MOT_DET
        movlw   0x01
        movwf   state bsf     PORT_A,RX_ON
        call    delay_20ms
        call    delay_20ms
        call    motion
        call    wait_low
        iorlw   0x00
        bz      t_motion
wake_00
        movlw   0x80
        movwf   rotate
wake_01
        clrwdt
        call    wait_high
        iorlw   0x00
        bz      t_motion
        call    wait_low
        iorlw   0x00
        bz      t_motion
        movwf   r_code
        decf    r_code,F
        bz      wake_00
        rrf     r_code,F
        rrf     rotate,F
        bnc     wake_01
        goto    wake_02
t_motion
        clrwdt
        bcf     PORT_A,RX_ON
        call    motion
        call    delay_100ms
        call    motion
        call    delay_100ms
        call    motion
        bsf     PORT_B,MOT_ENB
        iorlw   0
        bnz     test_bat
        decf    bat_cnt,F
        bnz     no_motion
        decf    bat_lp,F
        bnz     no_motion
        movlw   0x01
        movwf   bat_cnt
        movwf   bat_lp
no_motion
        clrwdt
        sleep
```

64

```
wake_02
        call    motion
        movlw   0x00
        iorwf   addr_1,W
        bnz     wake_03
        bsf     PORT_B,MOT_ENB
        clrf    moved
        movlw   01
        movwf   state
        movf    rotate,W
        movwf   addr_1
        movlw   S_ONE1
        movwf   tone_1
        movlw   S_ONE2
        movwf   tone_2
        movlw   S_ONE0
        movwf   tone_0
        movlw   S_ONE3
        movwf   tone_3
        call    s_alarm
        goto    test_bat
wake_03
        movlw   0x00
        iorwf   addr_2,W
        bnz     wake_04
        bsf     PORT_B,MOT_ENB
        clrf    moved
        movlw   01
        movwf   state
        movf    rotate,W
        movwf   addr_2
        movlw   S_TWO1
        movwf   tone_1
        movlw   S_TWO2
        movwf   tone_2
        movlw   S_TWO0
        movwf   tone_0
        movlw   S_TWO3
        movwf   tone_3
        call    s_alarm
        goto    test_bat
wake_04
        movf    addr_1,W
        subwf   rotate,W
        bz      wake_05
        movf    addr_2,W
        subwf   rotate,W
        bnz     wake_00
```

65

What is claimed is:

1. A method for assigning a unique identification code to a transmitter that transmits at least one of an old identification code and a new identification code within a single preselected frequency band, to a receiver that receives the identification codes within the single preselected frequency band, the method comprising the steps of:
continuously incrementing a value in a storage element after a first event is detected;
halting incrementing of the value in the storage element when a second event is detected, to generate a storage element value;
saving the storage element value in a memory of the transmitter as the new identification code;
transmitting the new identification code, the transmission continuing for a first predetermined period of time within the single preselected frequency band; and
the old and new identification codes being transmitted and received within the single preselected frequency band at equal frequencies.

2. The method according to claim 1 wherein the first event includes the step of applying electrical power to the transmitter.

3. The method according to claim 1 wherein the first event includes the step of inserting batteries into the transmitter.

4. The method according to claim 1 where the first event is an activation of a button on the transmitter by a user.

5. The method according to claim 1 where the second event is an activation of a button on the transmitter by a user.

6. The method according to claim 1 wherein the second event is the detection by the transmitter of an externally generated signal.

7. The method according to claim 1 wherein the second event is the lapse of a predetermined period of time.

8. The method according to claim 1 wherein the first length of time is approximately between five seconds and seven seconds.

9. The method according to claim 1 wherein transmission of at least one of the old and new identification codes in the single preselected frequency band and receiving the identification codes in the single preselected frequency band includes the step of transmitting and receiving radio frequency signals, respectively.

10. The method according to claim 9 wherein the radio frequency signals are transmitted in an ultra-high frequency band about between 300 Mhz and 3,000 Mhz.

11. The method according to claim 1 wherein transmission of at least one of the old and new identification codes in the single preselected frequency band and receiving the identification codes in the single preselected frequency band includes the step of transmitting and receiving ultrasonic signals, respectively.

12. The method according to claim 1 wherein transmission of at least one of the old and new identification codes in the single preselected frequency band and receiving the identification codes in the single preselected frequency band includes the step of transmitting and receiving infrared light signals, respectively.

13. The method according to claim 1 wherein the transmitter transmits the unique identification code in response to a user action.

14. The method according to claim 1 wherein the transmitter transmits the unique identification code in response to the detection by the transmitter of an externally generated signal.

15. The method according to claim 13 wherein the user action includes the step of the user activating a button on the transmitter.

16. The method according to claim 1 wherein the step of incrementing the storage element comprises the step of incrementing a counter.

17. A method for programming a new identification code generated by a transmitter that transmits at least one of an old identification code and the new identification code within a single preselected frequency band, into an unprogrammed receiver that receives the identification codes within the single preselected frequency band, the receiver being responsive thereto, the method comprising the steps of:
monitoring the single preselected frequency band for a received identification code, the monitoring continuing for a first predetermined period of time, when a first event is detected;
the old and new identification codes being transmitted and received within the single preselected frequency band at equal frequencies;
verifying the validity of the received identification code;
determining whether the received identification code exists in a memory of the receiver;
saving the received identification code in a memory of the receiver if the received identification code was not found in the memory of the receiver; and
halting the monitoring of the single preselected frequency band for a second predetermined period of time.

18. The method according to claim 17 wherein the first event is application of electrical power to the receiver.

19. The method according to claim 17 wherein application of electrical power includes the step of inserting batteries into the receiver.

20. The method according to claim 17 wherein the step of monitoring the predetermined frequency comprises the step of monitoring an ultra-high frequency band about between 300 Mhz and 3000 Mhz.

21. The method according to claim 17 wherein the step of verifying the validity of the identification code further includes the step of performing a check sum calculation.

22. The method according to claim 17 wherein the step of monitoring is repeated after a predetermined time interval.

23. The method according to claim 17 further including the steps of monitoring for the received identification code by monitoring the single preselected frequency band after the new identification code has been saved in memory and comparing the value of the received identification code to the value of the identification code saved in memory and issuing an indication to a user if the value of the received identification code equals the value of the identification code saved in memory.

24. The method according to claim 23 wherein the step of issuing the indication to the user includes issuing an audible indication.

25. The method of claim 23 wherein the step of issuing an indication to the user includes issuing a visual indication.

26. The method of claim 23 wherein the step of issuing an indication to the user includes issuing a tactile indication.

27. The method of claim 23 wherein the indicator issued to the user is extinguished upon a user action.

28. The method of claim 27 wherein the user action includes the step of physically moving the receiver to extinguish the user indication.

29. The method of claim 27 wherein the user action includes the step of activating a switch to extinguish the user indication.

30. The method of claim 23 wherein the indicator issued to the user is extinguished after a predetermined period of time.

31. The method according to claim 17 wherein a single transmitter generates and transmits at least one of the old and the new identification codes, the identification codes simultaneously received by a plurality of unprogrammed receivers such that each of the plurality of unprogrammed receivers is responsive to the identification codes corresponding to the single transmitter.

32. A method for synchronizing an unprogrammed receiver with a transmitter so that the unprogrammed receiver responds only to the transmitter, the transmitter transmitting at least one of an old and a new identification code within a single preselected frequency band, and the receiver receiving the identification codes within the single preselected frequency band, the method comprising the steps of:

continuously incrementing a value of a storage element in the transmitter when electrical power is initially applied to the transmitter;

halting incrementing of the value in the storage element in the transmitter when a first event is detected;

saving the value of the storage element in a memory of the transmitter as the new identification code;

transmitting the new identification code at a frequency defined by the single preselected frequency band, the transmission continuing for a first predetermined period of time;

monitoring the single preselected frequency band for a received identification code, the monitoring performed by the receiver during a portion of the first predetermined period of time and continuing for a second predetermined period of time beginning when electrical power is applied to the receiver, the old and new identification codes being transmitted and received within the single preselected frequency band at equal frequencies;

verifying the validity of the received identification code;

determining whether the received identification code exists in a memory of the receiver;

saving the received identification code in the memory of the receiver if the received identification code was not found in the memory of the receiver; and halting the monitoring of the single preselected frequency band for a third predetermined period of time.

33. The method according to claim 32 wherein the first predetermined period of time is greater than the sum of the second predetermined period of time and the third predetermined period of time.

34. The method according to claim 32 further including the steps of monitoring by the receiver for the received identification code by monitoring the preselected frequency range after the prior identification code has been saved in the memory of the receiver and comparing the received identification code to the prior identification code and issuing an indication to the user if the received identification code equals the prior identification code.

35. The method according to claim 34 wherein the step of issuing the indication to the user includes issuing an audible indication.

36. The method of claim 34 wherein the step of issuing an indication to the user includes issuing a visual indication.

37. The method of claim 34 wherein the step of issuing an indication to the user includes issuing a tactile indication.

38. The method of claim 34 wherein the indicator issued to the user is extinguished upon a user action.

39. The method of claim 38 wherein the user action includes the step of physically moving the receiver to extinguish the user indicator.

40. The method of claim 38 wherein the user action includes the step of activating a switch to extinguish the user indicator.

41. The method of claim 34 wherein the indication issued to the user is extinguished after a predetermined period of time.

42. The method according to claim 32 wherein the memory of the receiver includes a plurality of memory locations, each memory location corresponding to a unique identification code transmitted by the transmitter.

43. The method according to claim 42 wherein the memory of the transmitter includes a plurality of memory locations, each memory location corresponding to a unique identification code such that one transmitter independently activates a plurality of receivers.

44. The method according to claim 42 wherein the step of determining whether the received identification code exists in a memory of the receiver further includes the steps of:

a) determining whether the received identification code is found in the plurality of memory locations of the receiver; and b) saving the received identification code in a next unused memory location in the plurality of memory locations as an additional identification code so that the receiver responds to a plurality of transmitted identification codes.

\* \* \* \* \*